(12) United States Patent
Kawai

(10) Patent No.: US 10,728,417 B2
(45) Date of Patent: Jul. 28, 2020

(54) COMMUNICATION SYSTEM IN WHICH SERVER TRANSMITS TO TERMINAL DEVICE RESTRICTION INFORMATION FOR RESTRICTING SETTINGS OF IMAGE PROCESS

(71) Applicant: BROTHER KOGYO KABUSHIKI KAISHA, Nagoya, Aichi (JP)

(72) Inventor: Sunao Kawai, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 15/846,416

(22) Filed: Dec. 19, 2017

(65) Prior Publication Data

US 2018/0183970 A1    Jun. 28, 2018

(30) Foreign Application Priority Data

Dec. 27, 2016    (JP) ................. 2016-253785

(51) Int. Cl.
*H04N 1/32*      (2006.01)
*H04N 1/00*      (2006.01)
(Continued)

(52) U.S. Cl.
CPC ....... *H04N 1/32122* (2013.01); *H04L 67/306* (2013.01); *H04N 1/00344* (2013.01);
(Continued)

(58) Field of Classification Search
None
See application file for complete search history.

(56) References Cited

U.S. PATENT DOCUMENTS

2008/0068647 A1    3/2008    Isobe et al.
2008/0282333 A1    11/2008    Termamoto et al.
(Continued)

FOREIGN PATENT DOCUMENTS

| JP | 2008-104143 A | 5/2008 |
| JP | 2008-282216 A | 11/2008 |
| JP | 2014-095969 A | 5/2014 |

*Primary Examiner* — Benny Q Tieu
*Assistant Examiner* — Haris Sabah
(74) *Attorney, Agent, or Firm* — Scully Scott Murphy and Presser

(57) ABSTRACT

A communication system includes a server and a terminal device. In a memory of the server, first identification information is correlated to a plurality of sets of user information and a plurality of sets of restriction information. The first identification information identifies an image processing apparatus. Each of the plurality of sets of restriction information includes information for restricting settings of an image process available to a user specified by a corresponding set of user information. After receiving the target user information and identification information identifying the image processing apparatus, a server side controller acquires and transmits to the terminal device target restriction information. A terminal side controller receives the target restriction information from the server as a response to transmission of the target user information and the identification information; and outputting the target restriction information.

6 Claims, 10 Drawing Sheets

(51) Int. Cl.
*H04N 1/44* (2006.01)
*H04L 29/08* (2006.01)
H04L 29/06 (2006.01)
G06F 3/12 (2006.01)

(52) U.S. Cl.
CPC ......... *H04N 1/4413* (2013.01); *G06F 3/1255* (2013.01); *H04L 67/42* (2013.01); *H04N 1/00511* (2013.01); *H04N 2201/0094* (2013.01); *H04N 2201/3205* (2013.01); *H04N 2201/3223* (2013.01)

(56) References Cited

U.S. PATENT DOCUMENTS

| | | | |
|---|---|---|---|
| 2009/0225366 A1* | 9/2009 | Emori | G06F 3/1204 358/1.15 |
| 2010/0014110 A1* | 1/2010 | Munetomo | H04N 1/0084 358/1.14 |
| 2012/0307286 A1* | 12/2012 | Osaki | G06F 21/608 358/1.14 |
| 2013/0070288 A1* | 3/2013 | Muranaka | G06F 3/1204 358/1.15 |
| 2013/0258402 A1* | 10/2013 | Arai | G06K 15/40 358/1.15 |
| 2015/0153975 A1 | 6/2015 | Mori | |

* cited by examiner

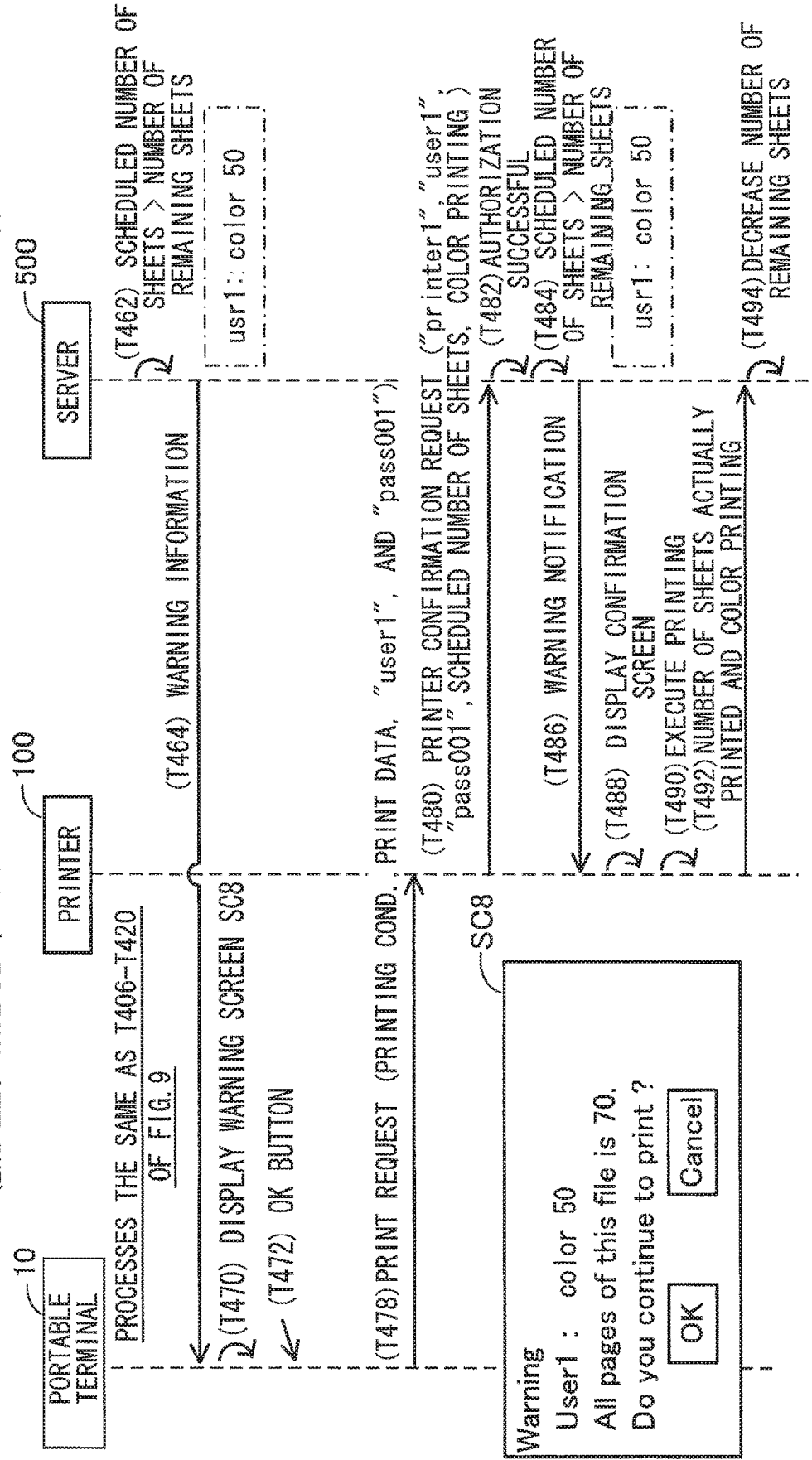

COMMUNICATION SYSTEM IN WHICH SERVER TRANSMITS TO TERMINAL DEVICE RESTRICTION INFORMATION FOR RESTRICTING SETTINGS OF IMAGE PROCESS

CROSS REFERENCE TO RELATED APPLICATION

This application claims priority from Japanese Patent Application No. 2016-253785 filed Dec. 27, 2016. The entire content of the priority application is incorporated herein by reference.

TECHNICAL FIELD

The present disclosure relates to a technology for externally outputting information related to an image processing apparatus.

BACKGROUND

A conventional technology known in the art enables mobile terminals to query a server regarding the availability of printers. The server stores printer identification information for each printer, and a plurality of serial numbers associated with each printer identified by the printer identification information. The mobile terminal uses near-field communication (NFC) to acquire the printer identification information from the printer and transmits this printer identification information to the server together with the serial number of the mobile terminal itself. The server uses the printer identification information received from the mobile terminal to identify all serial numbers associated with that printer identification information and transmits information to the mobile terminal indicating whether the mobile terminal is permitted to use the printer. Specifically, the server transmits information to the mobile terminal indicating that the printer is available to a user of the mobile terminal when the serial number received from the mobile terminal is included in the serial numbers identified as being associated with the printer identification information. On the other hand, the server transmits information to the mobile terminal indicating that the printer is unavailable to a user of the mobile terminal when the serial number received from the mobile terminal is not included in the serial numbers identified as being associated with the printer identification information.

SUMMARY

In the conventional technology described above, the server only transmits information to the mobile terminal that specifies whether a printer is available to a user of the mobile terminal, and does not consider any situation in which detailed information related to the printer could be transmitted to the mobile terminal.

In view of the foregoing, it is an object of the present disclosure to provide a technology capable of providing the user of a terminal device with detailed information related to an image processing apparatus.

In order to attain the above and other objects, the disclosure provides a communication system. The communication system includes a server and a terminal device. The server includes: a server side communication interface; a server side controller; and a memory storing first identification information, a plurality of sets of user information, and a plurality of sets of restriction information. The first identification information is correlated to the plurality of sets of user information and the plurality of sets of restriction information, the first identification information identifying an image processing apparatus. Each of the plurality of sets of user information specifies a user permitted to use the image processing apparatus, each of the plurality of sets of user information corresponding to one of the plurality of sets of restriction information. Each of the plurality of sets of restriction information includes information for restricting settings of an image process available to a user specified by a corresponding set of user information. The image process is performed by the image processing apparatus. The terminal device includes: a terminal side communication interface; and a terminal side controller configured to perform: receiving, from the image processing apparatus via the terminal side communication interface, identification information identifying the image processing apparatus; and in response to receiving the identification information from the image processing apparatus, transmitting target user information and the received identification information to the server via the terminal side communication interface, the target user information specifying a target user. The server side controller is configured to perform: receiving from the terminal device via the server side communication interface the target user information and the identification information, the identification information being received from the image processing apparatus and matching the first identification information; after receiving the target user information and the identification information matching the first identification information, acquiring target restriction information from among the plurality of sets of restriction information correlated to the first identification information, the target restriction information corresponding to the target user information among the plurality of sets of user information; and transmitting the acquired target restriction information to the terminal device via the server side communication interface. The terminal side controller is further configured to perform: receiving the target restriction information from the server via the terminal side communication interface as a response to transmission of the target user information and the identification information; and outputting the target restriction information.

According to another aspects, the disclosure provides a terminal device. The terminal device includes a communication interface and a controller. The controller is configured to perform: receiving, from an image processing apparatus via the communication interface, identification information identifying the image processing apparatus; in response to receiving the identification information from the image processing apparatus, transmitting target user information and the received identification information to a server via the communication interface, the target user information specifying a target user, the server storing first identification information, a plurality of sets of user information, and a plurality of sets of restriction information, the first identification information being correlated to the plurality of sets of user information and the plurality of sets of restriction information, the first identification information identifying the image processing apparatus, each of the plurality of sets of user information specifying a user permitted to use the image processing apparatus, each of the plurality of sets of user information corresponding to one of the plurality of sets of restriction information, each of the plurality of sets of restriction information including information for restricting settings of an image process available to a user specified by a corresponding set of user information, the image process being performed by the image processing apparatus; receiving target restriction information from the server via the terminal side communication interface as a response to transmission of the target user information and the identification information to the server, the target restriction information corresponding to the target user information among the plurality of sets of user information in the server; and outputting the target restriction information.

According to still another aspects, the disclosure provides a non-transitory computer readable storage medium storing a set of program instructions installed on and executed by a computer for controlling a terminal device. The set of program instructions includes: receiving, from an image processing apparatus via the communication interface, identification information identifying the image processing apparatus; in response to receiving, the identification information from the image processing apparatus, transmitting target user information and the received identification information to a server via the communication interface, the target user information specifying a target user, the server storing first identification information, a plurality of sets of user information, and a plurality of sets of restriction information, the first identification information being correlated to the plurality of sets of user information and the plurality of sets of restriction information, the first identification information identifying the image processing apparatus, each of the plurality of sets of user information specifying a user permitted to use the image processing apparatus, each of the plurality of sets of user information corresponding to one of the plurality of sets of restriction information, each of the plurality of sets of restriction information including information for restricting settings of an image process available to a user specified by a corresponding set of user information, the image process being performed by the image processing apparatus; receiving target restriction information from the server via the terminal side communication interface as a response to transmission of the target user information and the identification information to the server, the target restriction information corresponding to the target user information among the plurality of sets of user information in the server; and outputting the target restriction information.

BRIEF DESCRIPTION OF THE DRAWINGS

The particular features and advantages of the disclosure as well as other objects will become apparent from the following description taken in connection with the accompanying drawings, in which:

FIG. 10 is a sequence diagram illustrating a process executed in the communication system in a case B2 where the scheduled number of printing sheets is greater than the number of remaining printing sheets according to the second embodiment.

DETAILED DESCRIPTION

First Embodiment

Structure of a Communication System 2

Figure 1:
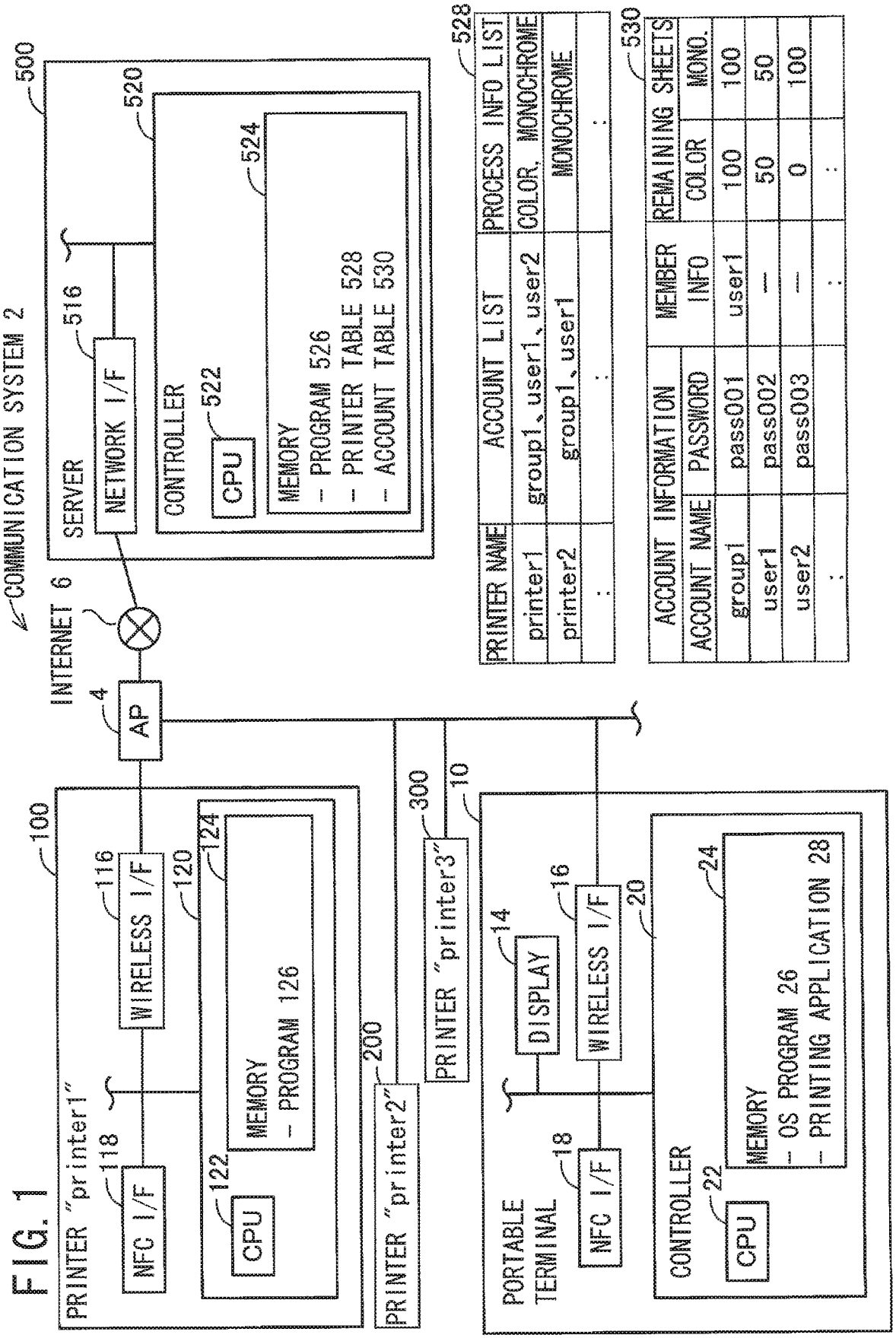
FIG. 1 is a block diagram illustrating a communication system according to a first embodiment.

FIG. 1 shows a communication system 2 according to a first embodiment of the present disclosure. The communication system 2 includes a portable terminal 10, a plurality of printers 100, 200, and 300, and a server 500. The portable terminal 10 and the printers 100, 200, and 300 establish wireless communications with an access point 4 (denoted by "AP" in FIG. 1) and consequently reside on a wireless network constructed by the access point 4. Accordingly, the portable terminal 10 and the printers 100, 200, and 300 can communicate with each other via the access point 4 using the wireless network. Note that the portable terminal 10 and the printers 100, 200, and 300 may reside on a wired network instead. Further, the portable terminal 10 and the printers 100, 200, and 300 can communicate with the server 500 via the access point 4 and the Internet 6. The portable terminal 10 may also communicate with the server 500 over the Internet 6 alone, without use of the access point 4, by using 3G or 4G wireless mobile telecommunications technology, for example.

Structure of the Mobile Terminal 10

As shown in FIG. 1, the portable terminal 10 is a portable terminal device, such as a mobile telephone (a smartphone, for example), a personal digital assistant (PDA), or a tablet computer. The portable terminal 10 includes a display 14, a wireless interface 16, a near-field communication (NFC) interface 18, and a controller 20. The display 14 is a device that can display various information. The display 14 may also include the functions of a touchscreen.

The wireless interface 16 implements wireless communications according to Wi-Fi technology and can establish a wireless connection with the access point 4. Wi-Fi technology uses a wireless communication method based on the IEEE (Institute of Electrical and Electronics Engineers, Inc.) 802.11 standard and its later versions (802.11a, 11b, 11g, and 11n, for example).

The NFC interface 18 can implement short-range wireless communications according to NFC protocols. The NFC protocols are wireless communication techniques based on the ISO/IEC 21481 or 18092 international standard.

Here, differences between Wi-Fi communications and NFC will be described. Wi-Fi communications can achieve faster data transfer speeds (a maximum transfer speed of 11-600 Mbps, for example) than NFC (a maximum transfer speed of 100-424 Kbps, for example). The frequency of carrier waves used in Wi-Fi communications (the 2.4 GHz or 5.0 GHz band, for example) also differs from that in NFC (the 13.56 MHz band, for example). Further, the maximum range at which Wi-Fi communications is possible (approximately 100 m, for example) is greater than the maximum range for NFC (approximately 10 cm, for example).

The controller 20 includes a CPU 22, and a memory 24. The CPU 22 executes various processes based on an operating system (OS) program 26 stored in the memory 24. The memory 24 is configured of volatile memory, nonvolatile memory, and the like (RAM and ROM, for example). The memory 24 also stores a printing application 28. The printing application 28 implements printing processes on the printers 100, 200, and 300. The vendor of the printers 100, 200, and 300 provides the printing application 28. The portable terminal 10 may install the printing application 28 from media shipped together with the printer 100, for example, or may install the printing application 28 from a server (not shown) on the Internet 6.

Structure of the Printers 100, 200, and 300

The printer 100 is a peripheral device (and specifically, a peripheral device to the portable terminal 10) that is capable of implementing a printing function. The printer 100 includes a wireless interface 116, an NFC interface 118, and a controller 120. The wireless interface 116, NFC interface 118, and controller 120 are all connected to a bus (not assigned a reference numeral). The wireless interface 116 can implement Wi-Fi communications and can establish a wireless connection with the access point 4. The NFC interface 118 can implement NFC.

The controller 120 includes a CPU 122, and a memory 124. The CPU 122 executes various processes according to a program 126 stored in the memory 124. The memory 124 is configured of volatile memory, nonvolatile memory, and the like (RAM and ROM, for example).

The printer 100 is assigned with the printer name "printer1" for identifying the printer 100. The printer 100 can execute both color printing and monochrome printing. The printer 200 is assigned with the printer name "printer2". The printer 200 has an identical structure to the printer 100, except that the printer 200 cannot execute color printing. That is, the printer 200 can execute only monochrome printing. The printer 300 is assigned with the printer name "printer3". The printer 300 has an identical structure to the printer 100.

Structure of the Server 500

The server 500 functions to manage the printers 100, 200, and 300. The server 500 is provided on the Internet 6 by the vendor of the printer 100 and the like. The server 500 includes a network interface 516, and a controller 520. The network interface 516 is connected to the Internet 6.

The controller 520 includes a CPU 522, and a memory 524. The CPU 522 executes various processes according to a program 526 stored in the memory 524. The memory 524 is configured of volatile memory, nonvolatile memory, and the like (RAM and ROM, for example). The memory 524 also stores a printer table 528, and an account table 530.

The printer table 528 records information related to printers. For each of a plurality of printers, the printer table 528 correlates the printer name of the printer ("printer1", for example), an account list that includes one or more account names ("group1" and "user1", for example) specifying one or more accounts authorized to use the printer, and a process information list that includes information specifying one or more types of printing processes (color printing and monochrome printing, for example) that the printer can implement. In this description, the term "account" is a concept that encompasses both individual users and groups to which one or more users belong. The administrators of the printers 100 and 200 access the server 500 and record information related to the respective printers 100 and 200 in the printer table 528, thereby creating the printer table 528 shown in FIG. 1. Note that the printer table 528 does not hold information related to the printer 300.

The account table 530 records information related to the accounts. For each of the plurality of accounts, the account table 530 correlates account information identifying the account, the number of remaining printing sheets available to the account for color printing, and the number of remaining printing sheets available to the account for monochrome printing. The account information includes an account name and a password.

Once account information has been recorded in the account table 530, the numbers of remaining printing sheets associated with that account information are decremented by the actual number of sheets printed each time a printing operation is executed according to a command from the account identified by the account information. When the number of remaining printing sheets reaches 0, printing according to commands from that account is no longer permitted. That is, the number of remaining printing sheets is information for limiting contents (factors or aspects) of printing processes available to the account through the printer 100 or the like. In other words, the number of remaining printing sheets is used for determining settings or conditions regarding the printing processes available to the account through the printer 100 or the like. The number of remaining printing sheets may be initialized to a prescribed number at prescribed periods (monthly, for example) or may be set to a number specified by the administrators of the respective printers 100 and 200. As described above, both the printers 100 and 200 can execute monochrome printing. Therefore, the number of remaining sheets for monochrome printing associated with certain account information is decremented by the number of sheets that are actually monochrome printed in response to commands from the account identified by that account information, regardless of whether the monochrome printing is performed on the printer 100 or the printer 200. Hence, the number of remaining sheets for monochrome printing is information for collectively limiting contents (settings, factors, or aspects) of monochrome printing available to the account through the printers 100 and 200.

For account information that includes an account name specifying a group ("group1", for example), the account table 530 also correlates member information specifying the account name of an individual user belonging to that group ("user1", for example).

The administrators of the printers 100 and 200 access the server 500 and record information for a plurality of accounts in the account table 530. The administrators also record member information in the account table 530 for account information that includes a group name. This completes creation of the account table 530 shown in FIG. 1.

Overview of the Process Performed on the Communication System

Figure 2:
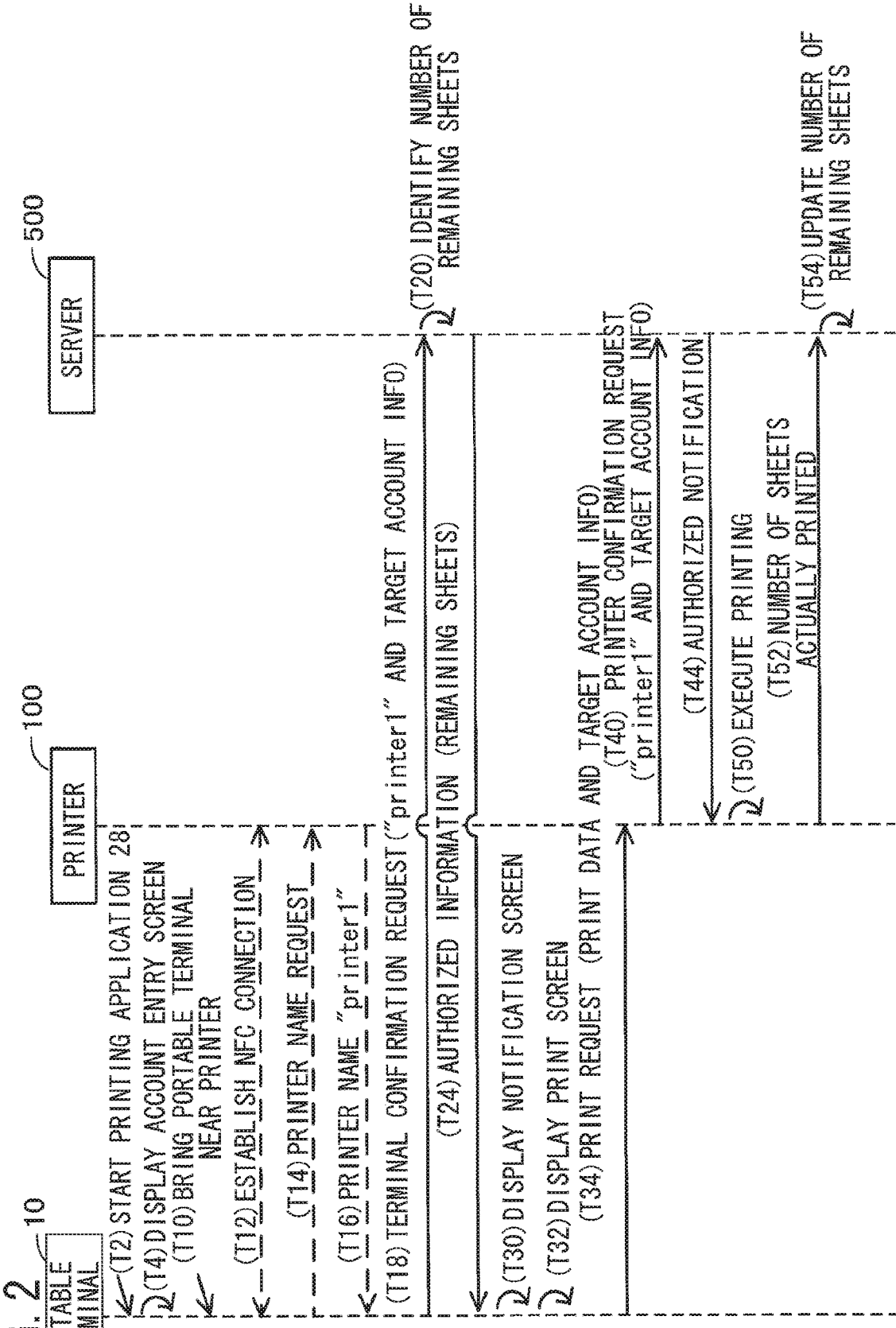
FIG. 2 is a sequence diagram illustrating a process executed in the communication system according to the first embodiment.

Next, an overview of the process executed by the portable terminal 10, the printer 100, and the server 500 of the communication system 2 will be described with reference to the sequence diagram in FIG. 2. Following this overview, the process executed by each of the portable terminal 10, the printer 100, and the server 500 will be described in greater detail. In FIG. 2, NFC is represented by arrows with dashed lines, while all other communications (Wi-Fi communications, for example) are represented by arrows with solid lines. This format is also used in FIG. 6 and subsequent sequence diagrams.

In T2 of FIG. 2, the user of the portable terminal 10 starts up the printing application 28. In response, the portable terminal 10 displays an account entry screen in T4 prompting the user to input account information. After the user inputs account information into the account entry screen, in T10 the user brings the portable terminal 10 near the printer 100. When the distance between the NFC interface 18 of the portable terminal 10 and the NFC interface 118 of the printer 100 reaches a prescribed distance (10 cm, for example) or less, in T12 the portable terminal 10 and printer 100 establish an NFC connection.

In T14 the portable terminal 10 transmits a printer name request to the printer 100 via the NFC interface 18 using the established NFC connection. A printer name request is a request sent to a printer to acquire the printer name of that printer. In response to receiving the printer name request, in T16 the printer 100 transmits the printer name "printer1" to the portable terminal 10 via the NFC interface 118 using the NFC connection. In other words, the portable terminal 10 receives the printer name "printer1", as a response to the printer name request, from the printer 100 via the NFC interface 118 using the NFC connection.

After receiving the printer name "printer1", in T18 the portable terminal 10 transmits a terminal confirmation request to the server 500 via the wireless interface 16. The terminal confirmation request is a request to confirm the number of remaining printing sheets that the user of the portable terminal 10 can use with the printer 100. The terminal confirmation request includes the printer name "printer1", and the account information inputted into the account entry screen in T4 (hereinafter called the "target account information").

In response to receiving a terminal confirmation request from the portable terminal 10 via the network interface 516, in T20 the server 500 determines whether the printer name "printer1" and the target account information included in the terminal confirmation request are recorded in the tables 528 and 530 stored in the memory 524. When determining that the printer name "printer1" and the target account information are recorded in the tables 528 and 530, the server 500 uses the printer name "printer1". and the target account information to identify the numbers of remaining sheets for color printing and monochrome printing in the account table 530 associated with the target account information.

In T24 the server 500 transmits authorized information to the portable terminal 10 via the network interface 516. The authorized information includes the number of remaining sheets for color printing and the number of remaining sheets for monochrome printing identified in T20.

In response to receiving authorized information from the server 500 via the wireless interface 16, in T30 the portable terminal 10 displays a notification screen on the display 14. The notification screen serves to notify the user of the portable terminal 10 of the numbers of remaining printing sheets included in the authorized information. Next, the portable terminal 10 displays a print screen in T32. The print screen enables the user to select an image file to be printed and to set printing conditions such as the color mode (color printing or monochrome printing, for example), the number of copies, the sheet size, and the like. In T34 the portable terminal 10 generates print data based on the image file and printing conditions selected in the print screen and transmits a print request that includes this print data to the printer 100 via the wireless interface 16. The print request is a request for the printer 100 to execute a printing process. The print request also includes the target account information.

In response to receiving the print request from the portable terminal 10 via the wireless interface 116, in T40 the printer 100 transmits a printer confirmation request to the server 500 via the wireless interface 116. The printer confirmation request includes the printer name "printer1" and the target account information.

After receiving the printer confirmation request from the printer 100 via the network interface 516, the server 500 determines whether the printer name "printer1" and the target account information are recorded in the corresponding tables 528 and 530 stored in the memory 524. When determining that the printer name "printer1" and the target account information are recorded in the corresponding tables 528 and 530, in T44 the server 500 transmits an authorized notification to the printer 100 via the network interface 516. The authorized notification is a notification for allowing the printer 100 to execute the printing process.

As a response to receiving the authorized notification from the server 500 via the wireless interface 116, in T50 the printer 100 prints images specified by the print data received in T34. Subsequently, in T52 the printer 100 transmits the number of sheets actually printed in T50 (hereinafter called the "printed sheet count") to the server 500 via the wireless interface 116.

In response to receiving the printed sheet count from the printer 100 via the network interface 516, in T54 the server 500 subtracts this printed sheet count from the number of remaining printing sheets associated with the target account information and updates the number of remaining printing sheets in the account table 530.

Note that it is also possible to omit the process in steps T10-T30 and execute the process beginning from T32. Specifically, after the user inputs account information into the account entry screen in T4 and performs a prescribed operation on the portable terminal 10, the portable terminal 10 may search via the wireless interface 16 for all printers residing on the wireless network formed by the access point 4, without establishing an NFC connection with the printer 100. Next, the portable terminal 10 displays the printer names of all printers found on the wireless network and, after the user has selected the printer name of the printer 100, displays the print screen as described above in step T32. Thereafter, the process following T32 is executed.

Process Executed on the Portable Terminal 10

Next, the process executed by the CPU 22 of the portable terminal 10 in accordance with the printing application 28 will be described in detail with reference to FIG. 3. The CPU 22 begins executing this process when the printing application 28 is started. Although not shown in the drawings, the CPU 22 displays the account entry screen on the display 14 that enables the user to enter account information (see T4 of FIG. 2). When the user enters the account information (i.e., the account name and the password) in the account entry screen, the CPU 22 advances to S12 of FIG. 3. In the following description, the account information entered in the account entry screen will be called the "target account information."

Figure 3:
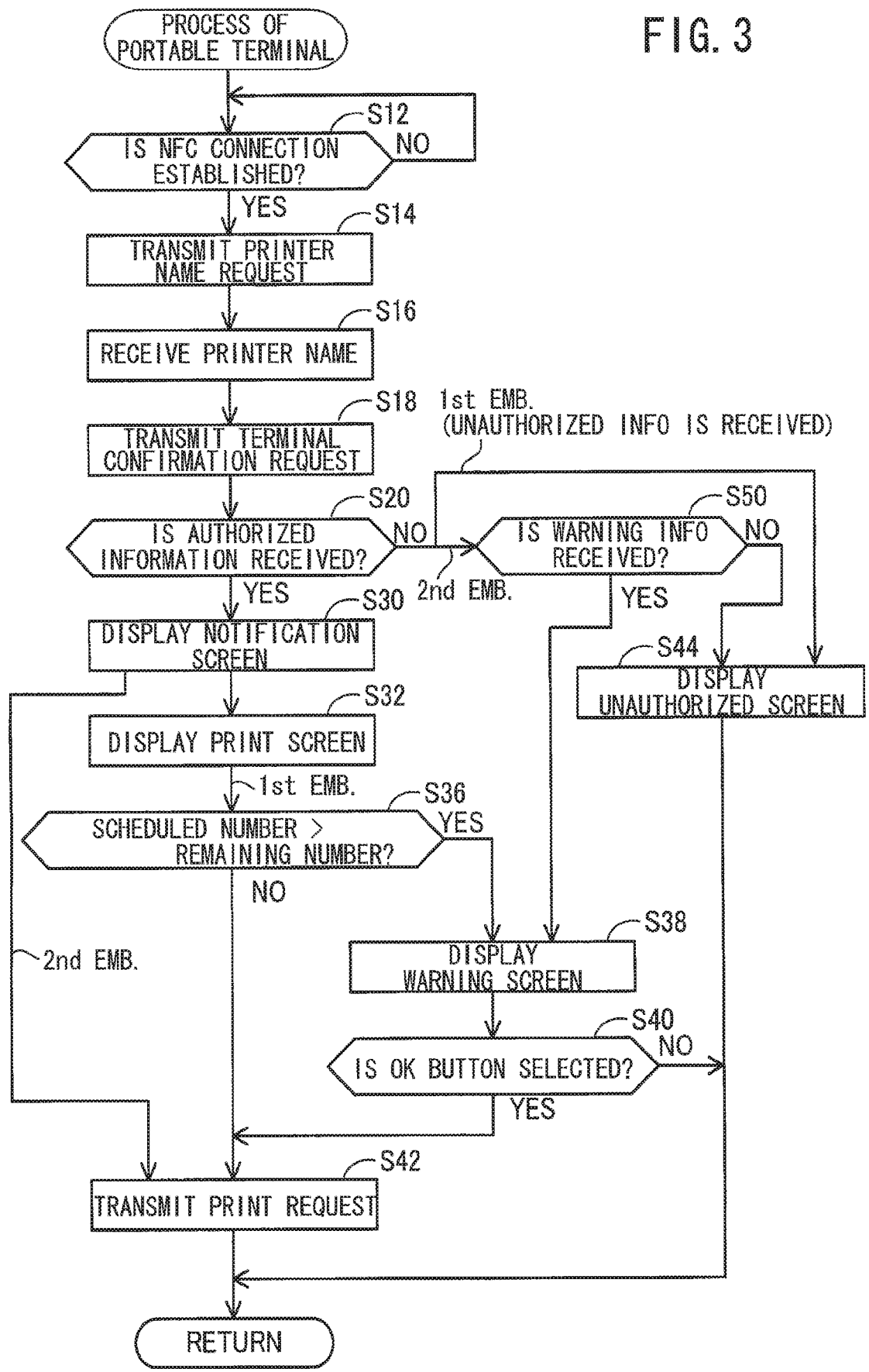
FIG. 3 is a flowchart illustrating a process of a portable terminal according to the first embodiment.

In S12 of FIG. 3, the CPU 22 monitors the NFC interface 18 to determine whether an NFC connection has been established with a target printer (the printer 100, for example). When the CPU 22 acquires information from the NFC interface 18 indicating that an NFC connection has been established, the CPU 22 reaches a YES determination in S12 and advances to S14.

In S14 the CPU 22 uses the established NFC connection to transmit the printer name request to the target printer via the NFC interface 18. In S16 the CPU 22 receives the printer name from the target printer via the NFC interface 18. In the following description, the printer name received from the target printer will be called the "target printer name."

In S18 the CPU 22 transmits a terminal confirmation request including the target printer name and the target account information (i.e., the account name and the password) to the server 500 via the wireless interface 16, without having received a command from the user of the portable terminal 10. Accordingly, the user can learn the number of remaining printing sheets that is recorded on the server 500 simply by bringing the portable terminal 10 near the printer, rather than having to provide additional instructions to the portable terminal 10.

In S20 the CPU 22 determines whether authorized information or unauthorized information was received from the server 500 via the wireless interface 16. When the target printer name is recorded in the printer table 528 and the target account information is recorded in the account table 530, i.e., when authorization is successful, the server 500 transmits authorized information to the portable terminal 10. The authorized information includes the numbers of remaining printing sheets associated with the target account information. When the target printer is the printer 100 or another printer capable of executing both color printing and monochrome printing, the authorized information includes both the number of remaining sheets for color printing and the number of remaining sheets for monochrome printing. When the target printer is the printer 200 or another printer capable of executing only monochrome printing, the authorized information includes only the number of remaining sheets for monochrome printing. Note that, if the target account information includes the account name of an individual user, the authorized information may include the group name for the group to which the individual user belongs, and the numbers of remaining printing sheets for that group in addition to the numbers of remaining printing sheets for the individual user. The server 500 transmits unauthorized information to the portable terminal 10 when the authorization described above fails. The unauthorized information indicates that the account name in the target account information cannot use the target printer. The CPU 22 advances to S30 in a case where the authorized information was received (S20: YES), and advances to S44 in a case where the unauthorized information was received (S20: NO).

In S44 the CPU 22 displays an unauthorized screen on the display 14 indicating that the target printer cannot be used. After completing the process in S44, the CPU 22 returns to S12.

In S30 the CPU 22 displays a notification screen on the display 14. The notification screen includes each number of remaining printing sheets provided in the authorized information. In this way, the CPU 22 can notify the user of each number of remaining printing sheets available to the user through the target printer. Note that when the authorized information also includes the group name and the numbers of remaining printing sheets for that group, the authorized screen includes the number(s) of remaining printing sheets for the group, as well. In this way, the CPU 22 can notify the user of the number(s) of remaining printing sheets for the group to which the user belongs.

In S32 the CPU 22 displays a print screen on the display 14 after displaying the notification screen. The print screen includes a selection field for selecting an image file to be printed, selection fields for selecting printing conditions (color mode, number of copies, paper size, etc.), and an OK button. Note that if the authorized information includes only the number of remaining sheets for monochrome printing, the print screen does not include a selection field under the printing conditions for selecting the color mode. In this case, monochrome printing is automatically selected as the color mode. Further, if the authorized information also includes a group name and the numbers of remaining printing sheets for that group, the print screen also includes a selection field for selecting one of the account names from among the account name provided in the target account information and the group name included in the authorized information. After the user has made a selection in each selection field and has operated the OK button, the CPU 22 advances to S36.

In S36 the CPU 22 first calculates a scheduled number of sheets based on the number of pages in the image file selected in the print screen, and the printing conditions (number of copies, for example) selected in the print screen. If monochrome printing was selected under the printing conditions in the print screen as the color mode, the CPU 22 determines whether the scheduled number of sheets is greater than the number of remaining sheets for monochrome printing included in the authorized information. However, if color printing was selected under the printing conditions in the print screen as the color mode, the CPU 22 determines whether the scheduled number of sheets is greater than the number of remaining sheets for color printing included in the authorized information. Here, if the authorized information also includes a group name and the numbers of remaining printing sheets for that group and the user selected the group name in the print screen, the CPU 22 determines whether the scheduled number of sheets is greater than the number of remaining printing sheets available to the group that is provided in the authorized information for the selected color mode (i.e., color printing or monochrome printing). The CPU 22 advances to S38 when determining that the scheduled number of sheets is greater than the number of remaining printing sheets (S36: YES) and advances to S42 when determining that the scheduled number of sheets is less than or equal to the number of remaining printing sheets (S36: NO).

In S38 the CPU 22 displays a warning screen on the display 14. The warning screen includes a warning message specifying that not all of the scheduled number of sheets can be printed, an OK button, and a Cancel button. The CPU 22 advances to S40 after the user selects either the OK button or the Cancel button.

In S40 the CPU 22 determines whether the OK button was selected in the warning screen. The CPU 22 advances to S42 when determining that the OK button was selected (S40: YES) and skips S42 (i.e., does not control the target printer to print the target image) and returns to S12 when determining that the Cancel button was selected (S40: NO).

In S42 the CPU 22 generates print data based on the image file selected in the print screen in S32 and the printing conditions selected in the same print screen. More specifically, the CPU 22 converts the image file based on the selected printing conditions and generates print data in a data format that the target printer can interpret. The above conversion includes a color conversion process for converting multilevel RGB bitmap data to multilevel CMYK bitmap data, and a halftone process for converting the multilevel CMYK bitmap data to CMYK bitmap data having relatively fewer gradations (i.e., print data), for example. Next, the CPU 22 transmits a print request to the target printer via the wireless interface 16. Here, the print request includes the selected printing conditions, the generated print data, and the target account information. As a variation, in S42 the CPU 22 may transmit a print data generation request including the image file and the printing conditions to a print data generating server (not shown) instead of generating the print data by converting the image file. The print data generation request prompts the print data generating server to generate print data according to the image file and the printing conditions in the print data generation request. In response to transmitting this print data generation request, the CPU 22 may receive print data generated and transmitted by the print data generating server. Subsequently, the CPU 22 may transmit a print request to the target printer that includes the selected printing conditions, the received print data, and the target account information.

While not shown in the drawings, when the authorized information includes the group name and the numbers of remaining printing sheets for the group and when the user has selected the group name in the print screen in S32, the CPU 22 displays a password entry screen on the display 14 prompting the user to enter a password associated with the group name prior to transmitting the print request in S42. Subsequently, the CPU 22 transmits a print request to the printer 100 that includes, in place of the target account information, account information that includes the group name and the inputted password (i.e., the account information that identifies the group). After completing the process in S42, the CPU 22 returns to S12. As a variation, the CPU 22 need not display the password entry screen on the display 14 when the user has selected the group name in the print screen in S32. In this case, the CPU 22 may transmit a print request to the printer 100 that includes target account information that was inputted prior to S12, and the group name selected in the print screen in S32. Next, the printer 100 may transmit a printer confirmation request to the server 500 that includes the target account information and the group name, directing the server 500 to execute authorization based on the target account information (see S212 of FIG. 5 described later). In response, the server 500 may execute account authorization based on the target account information included in the printer confirmation request (see S106 in S152 of FIG. 4 described later) and may subtract the printed sheet count from the number of remaining printing sheets in the account table 530 associated with the group name included in the printer confirmation request (see S158 of FIG. 4 described later).

Process Executed on the Server 500

Next, the process executed by the CPU 522 of the server 500 according to the program 526 will be described in detail with reference to FIG. 4. The program 526 initiates this process when the power to the server 500 is turned on.

Figure 4:
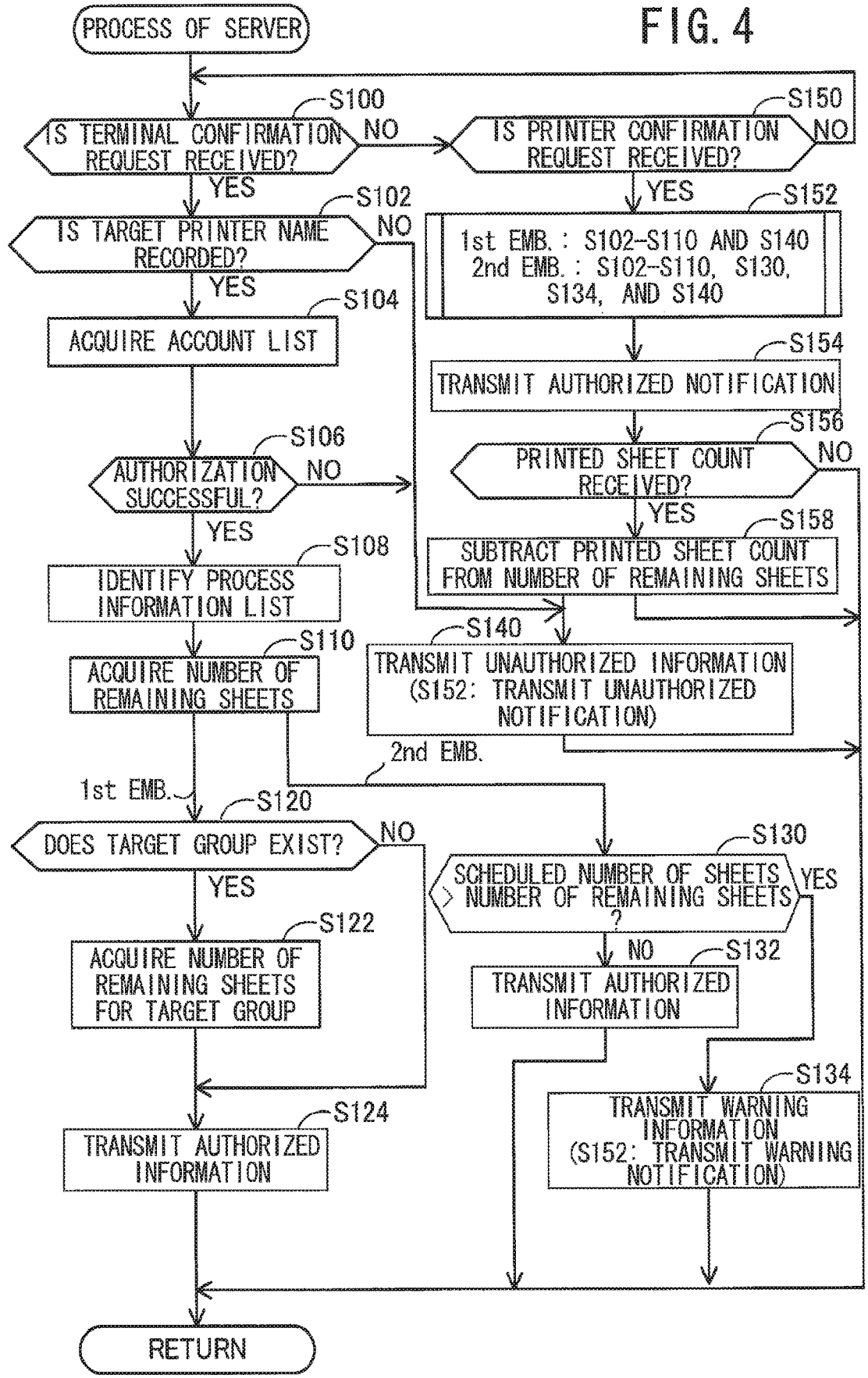
FIG. 4 is a flowchart illustrating a process of a server according to the first embodiment.

In S100 of FIG. 4, the CPU 522 monitors the network interface 516 to determine whether the terminal confirmation request has been received from the portable terminal 10 (see S18 of FIG. 3) and in S150 monitors the network interface 516 to determine whether the printer confirmation request has been received from a printer (the printer 100, for example). The CPU 522 advances to S102 when the terminal confirmation request that includes the printer name and the account information (i.e., the account name and the password) has been received from the portable terminal 10 (S100: YES). In the following description, the printer name, the account name, and the password included in the terminal confirmation request will be called the target printer name, the target account name, and the target password, respectively.

In S102 the CPU 522 determines whether the target printer name is recorded in the printer table 528. The CPU 522 advances to S104 when determining that the target printer name is recorded in the printer table 528 (S102: YES) and advances to S140 when determining that the target printer name is not recorded in the printer table 528 (S102: NO).

In S140 the CPU 522 transmits the unauthorized information to the portable terminal 10 via the network interface 516 indicating that the target printer cannot be used (see S20: NO and S44 of FIG. 3). After completing the process in S140, the CPU 522 resumes monitoring in S100 and S150.

In S104 the CPU 522 acquires an account list associated with the target printer name from the printer table 528. In S106 the CPU 522 first determines whether the target account name in the terminal confirmation request is also included in the account list acquired in S104. If the CPU 522 determines that the target account name is not included in the account list acquired from the printer table 528, then authorization has failed (S106: NO) and the CPU 522 advances to S140. However, if the CPU 522 determines that the target account name is included in the account list, then the CPU 522 acquires the password associated with the target account name from the account table 530. Next, the CPU 522 determines whether the target password in the terminal confirmation request matches the password acquired from the account table 530. If the CPU 522 determines that the target password does not match the password acquired from the account table 530, then authorization has failed (S106: NO) and the CPU 522 advances to S140. However, if the CPU 522 determines that the target password matches the acquired password, then authorization is successful (S106: YES) and the CPU 522 advances to S108.

In S108 the CPU 522 identifies the process information list in the printer table 528 that is associated with the target printer name. In S110 the CPU 522 acquires the number(s) of remaining printing sheets from the account table 530 that corresponds to the numbers of color mode(s) (i.e., monochrome printing and color printing) specified in the identified process information list from among the numbers of remaining sheets for color printing and monochrome printing associated with the target account name. For example, when the process information list identified in S108 includes only monochrome printing, the CPU 522 acquires only the number of remaining sheets for monochrome printing from the account table 530 that is associated with the target account name. Alternatively, if the process information list indicates both color printing and monochrome printing, the CPU 522 acquires both numbers of remaining sheets for color printing and monochrome printing from the account table 530 that are associated with the target account name.

In S120 the CPU 522 determines whether a target group exists. Specifically, the CPU 522 determines whether member information including the target account name exists in the account table 530 and determines whether the account information includes the account name of the group ("group1", for example). If the CPU 522 determines that member information including the target account name does not exist in the account table 530, then a target group does not exist (S120: NO) and the CPU 522 skips S122 and advances to S124. However, if the CPU 522 determines that member information including the target account name is present in the account table 530, then the CPU 522 acquires the account name (i.e., the group name) from the account table 530 that is associated with the member information. Next, the CPU 522 determines whether the group name acquired above is included in the account list acquired in S104. If the CPU 522 determines that the group name does not exist in the account list, then a target group does not exist (S120: NO), and the CPU 522 skips S122 and advances to S124. However, if the CPU 522 determines that the group name acquired above is included in the account list, then a target group identified by the group name does exist (S120: YES), and the CPU 522 advances to S122.

In S122 the CPU 522 acquires the number of remaining printing sheets from the account table 530 that is associated with the group name used to identify the target group. As in S110 described above, the CPU 522 acquires the number(s) of remaining sheets corresponding to the color mode(s) specified by the process information list identified in S108 from among the numbers of remaining sheets for color printing and monochrome printing that are associated with the group name.

In S124 the CPU 522 transmits the authorized information to the portable terminal 10 via the network interface 516 that includes the number(s) of remaining printing sheets acquired in S110 (see S20: YES in FIG. 3). Further, when a YES determination was made in S120, the authorized information transmitted in S124 includes a group name used to identify the target group and the number(s) of remaining printing sheets acquired in S122. After completing the process in S124, the CPU 522 resumes monitoring in S100 and S150. In S120, the CPU 522 may determine whether the printer confirmation request includes the account name of a group ("group1", for example). Here, the CPU 522 determines that the account name indicates a group when the account name has specific character string ("group" for example). If the printer confirmation request includes the account name of the group ("group1" for example), the CPU 522 specifies account names for individual user belonging to that group. Specifically, the CPU 522 refers to the member information in the account table 130 associated with the account name ("group1" in this example), and specifies individual user name(s) ("user1" in this example) belonging to the group ("group1"). In this case the CPU 122 makes an YES determination when the member information in the account table 130 associated with the account name ("group1" in this example) includes the account name as the individual user. Subsequently, in S122 the CPU 522 acquires the number of remaining printing sheets from the account table 530 that is associated with each individual user name ("user1"). In this case, in S124 the authorized information may include the number(s) of remaining printing sheets from the account table 530 that is associated with the individual user name ("user1").

On the other hand, if the CPU 522 receives the printer confirmation request from a printer such as the printer 100 (S150: YES), the CPU 522 advances to S152. The printer transmits the printer confirmation request to the server 500 (see T40 of FIG. 2) in response to the print request from the portable terminal 10 (see T34). The printer confirmation request includes the printer name and the account information (i.e., the account name and the password) included in the print request. In the following description, the source printer of the printer confirmation request in S150 will be called the "target printer."

In S152 the CPU 522 executes the same process described above in S102-S110 and S140 using the printer name and the account information in the printer confirmation request. S154 is executed when the CPU 522 reaches YES determinations in S102 and S106 within step S152. In this case, S140 is not executed within step S152. If the CPU 522 reaches a NO determination in either S102 or S106 within step S152, then in S140 within step S152 the CPU 522 transmits the unauthorized notification to the target printer via the network interface 516. In this case, S108 and S110 are not executed within step S152. The unauthorized notification indicates that the target printer cannot be used.

In S110 within step S152, the CPU 522 acquires the number(s) of remaining printing sheets associated with the account name in the printer confirmation request. This step is identical to S110 executed after a YES determination in S100. However, when the CPU 522 receives the printer confirmation request (S150: YES), the CPU 522 does not execute steps S120 through S124. Specifically, when the account information in the printer confirmation request includes the account name for the individual user ("user1", for example), the CPU 522 acquires the number(s) of remaining printing sheets corresponding to the account name of the individual user, but does not acquire the number(s) of remaining printing sheets corresponding to the account name specifying a group to which the individual user belongs. On the other hand, when the account information in the printer confirmation request includes the account name of the group ("group1", for example), the CPU 522 acquires the number(s) of remaining printing sheets corresponding to the account name of that group, but does not acquire the numbers of remaining printing sheets corresponding to the account name for an individual user belonging to that group.

In S154 the CPU 522 transmits the authorized notification to the target printer via the network interface 516. The authorized notification indicates that printing is allowed. The authorized notification includes the number(s) of remaining printing sheets acquired in S110 within step S152.

In S156 the CPU 522 monitors the network interface 516 to determine whether the printed sheet count has been received from the target printer via the network interface 516. When a printed sheet count is received (S156: YES), the CPU 522 advances to S158. However, if the printed sheet count is not received within a prescribed time period after the authorized notification was transmitted (S156: NO), the CPU 522 skips S158 and resumes monitoring in S100 and S150. When receiving the printed sheet count, the CPU 522 also receives color mode information specifying whether monochrome printing or color printing was executed.

In S158 the CPU 522 subtracts the printed sheet count from the number of remaining printing sheets stored in the account table 530 in association with the account name included in the printer confirmation request. Specifically, when the color mode information received in S156 specifies monochrome printing, the CPU 522 subtracts the printed sheet count from the number of remaining sheets for monochrome printing associated with the account name. Similarly, when the color mode information specifies color printing, the CPU 522 subtracts the printed sheet count from the number of remaining sheets for color printing associated with the account name. After completing the process in S158, the CPU 522 resumes monitoring in S100 and S150.

Process Executed on the Printer 100

Next, the process executed by the CPU 122 of the printer 100 according to the program 126 will be described in detail with reference to FIG. 5. The CPU 122 initiates this process when the power to the printer 100 is turned on. Note that the printers 200 and 300 similarly execute the process shown in FIG. 5.

Figure 5:
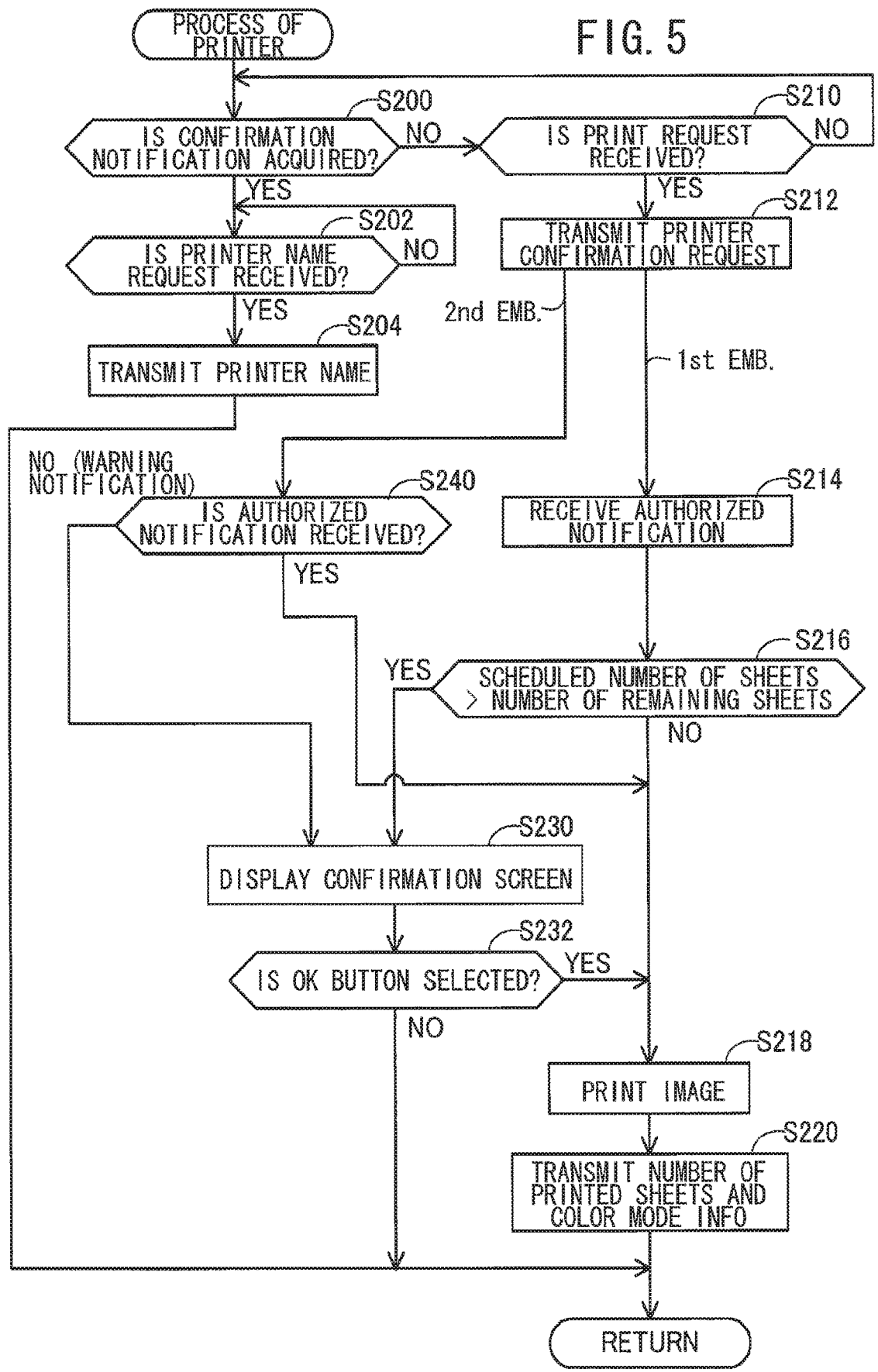
FIG. 5 is a flowchart illustrating a process of a printer according to the first embodiment.

In S200 of FIG. 5, the CPU 122 monitors the NFC interface to determine whether a confirmation notification is acquired from the NFC interface 118. The confirmation notification indicates that an NFC connection has been established with the portable terminal 10. In S210 the CPU 122 monitors the wireless interface 116 to determine whether the print request was received from the portable terminal 10. When the confirmation notification is acquired from the NFC interface 118 (S200: YES), the CPU 122 advances to S202.

In S202 the CPU 122 monitors the NFC interface 118 to determine whether the printer name request was received from the portable terminal 10 (see S14 of FIG. 3). If the printer name request was received (S202: YES), in S204 the CPU 122 transmits the printer name "printer1" of the printer 100 to the portable terminal 10 via the NFC interface 118 (see S16 of FIG. 3). After completing the process in S204, the CPU 122 resumes monitoring in S200 and S210.

On the other hand, if the CPU 122 receives the print request from the portable terminal 10 via the wireless interface 116 (S210: YES), the CPU 122 advances to S212 (see S42 of FIG. 3). In S212 the CPU 122 transmits the printer confirmation request to the server 500 via the wireless interface 116 (S150: YES in FIG. 4). The printer confirmation request includes the printer name "printer1" of the printer 100 and the account information included in the print request received in S210.

In S214 the CPU 122 receives the authorized notification from the server 500 via the wireless interface 116 (see S154 in FIG. 4), and advances to S216. While not shown in the drawings, the CPU 122 may receive the unauthorized notification from the server 500 via the wireless interface 116 (see S140 within S152 of FIG. 4). When receiving the unauthorized notification, the CPU 122 displays the screen on the display (not shown) of the printer 100 indicating that the printer 100 cannot be used. Subsequently, the CPU 122 resumes monitoring in S200 and S210.

In S216 the CPU 122 calculates the scheduled number of printing sheets based on the number of pages in the printed data included in the print request, and printing conditions included in the print request (the number of copies, for example). Next, the CPU 122 determines whether the scheduled number of printing sheets calculated above is greater than the number of remaining printing sheets included in the authorized notification. Specifically, the CPU 122 determines whether the scheduled number of printing sheets is greater than the number of remaining sheets for monochrome printing included in the authorized notification when the color mode set in the printing conditions included in the print request indicates monochrome printing and determines whether the scheduled number of printing sheets is greater than the number of remaining sheets for color printing included in the authorized notification when the color mode set in the printing conditions included in the print request indicates color printing. The CPU 122 advances to S218 when determining that the scheduled number of printing sheets is less than or equal to the number of remaining printing sheets (S216: NO) and advances to S230 when determining that the scheduled number of printing sheets is greater than the number of remaining printing sheets (S216: YES).

In S230 the CPU 122 displays a confirmation screen on the display of the printer 100. The confirmation screen includes a message indicating that not all of the scheduled number of printing sheets can be printed, an OK button for specifying a desire to initiate printing, and a Cancel button.

In S232 the CPU 122 determines whether the OK button was selected in the confirmation screen. The CPU 122 advances to S218 when determining that the OK button was selected (S232: YES). The CPU 122 skips steps S218 and S220 (i.e., does not execute a printing operation) and resumes monitoring in S200 and S210 when determining that the Cancel button was selected (S232: NO).

In S218 the CPU 122 prints an image specified by the print data included in the print request according to the printing conditions included in the print request. When the process in S218 is performed after the CPU 122 reaches a NO determination in S216, the CPU 122 prints all of the scheduled number of printing sheets. However, when the process in S218 is executed after the CPU 122 reaches a YES determination in S232, the CPU 122 prints only a portion of the scheduled number of printing sheets. More specifically, the CPU 122 performs monochrome printing for a number of printing sheets equivalent to the number of remaining sheets for monochrome printing provided in the authorized notification when the color mode set in the printing conditions included in the print request indicates monochrome printing, and performs color printing for a number of printing sheets equivalent to the number of remaining sheets for color printing provided in the authorized notification when the color mode set in the printing conditions indicates color printing.

In S220 the CPU 122 transmits the number of sheets actually printed in S218 (i.e., the printed sheet count) and color mode information specifying whether color printing or monochrome printing was executed to the server 500 via the wireless interface 116 (S156: YES of FIG. 4). After completing the process in S220, the CPU 122 resumes monitoring in S200 and S210.

Specific Case A1

Next, a specific case A1 implemented according to the processes in FIGS. 3 through 5 will be described with reference to FIG. 6. After executing the same processes in T2 and T4 of FIG. 2, in T106 the user inputs the account name "user1" and the password "pass001" into the account entry screen. Steps T110-T116 are identical to Steps T10-T16 of FIG. 2.

In T118 the portable terminal 10 transmits a terminal confirmation request to the server 500 (see S118 of FIG. 3). The terminal confirmation request includes the printer name "printer1" and the account information (i.e., "user1" and "pass001").

In response to receiving the terminal confirmation request (S100: YES of FIG. 4), the server 500 determines whether the printer name "printer1" and the account information in the terminal confirmation request are included in the printer table 528 and account table 530. As a result, the server 500 determines in T120 that authorization was successful (S106: YES).

Next, the server 500 identifies the process information list associated with the printer name "printer1" in the printer table 528 (S108). Since the process information list identified above specifies both color printing and monochrome printing, the server 500 acquires the number "50" of remaining sheets for color printing and the number "50" of remaining sheets for monochrome printing that are associated with the account name "user1" in the account table 530 (S110). In the following description, the number "50" of the remaining sheets for color printing (or monochrome printing) will be given the notation "color 50" (or "mono 50"). The notation of these numbers may be modified as desired.

The server 500 also determines whether a target group is present (S120). Since member information including the account name "user1" is present in the account table 530, the server 500 identifies the account name "group1" in the account table 530 that is associated with this member information. Further, since the account name "group1" is included in the account list associated with the printer name "printer1", the server 500 determines that a target group exists (S120: YES). Accordingly, the server 500 acquires "color 100" and "mono 100" associated with the account name "group1" from the account table 530 (S122).

In T124 the server 500 transmits authorized information to the portable terminal 10 (S124). The authorized information includes "color 50" and "mono 50" associated with the account name "user1", and "color 100" and "mono 100" associated with the account name "group1".

When the portable terminal 10 receives authorized information (S20: YES in FIG. 3), the portable terminal 10 displays a notification screen SC1 in T130 (S30). The notification screen SC1 includes the numbers of remaining printing sheets included in the authorized information, and a Next button for displaying the print screen. Accordingly, the user can learn the numbers of remaining printing sheets corresponding to the account name "user1" that was inputted in T106, and the numbers of remaining printing sheets corresponding to the account name "group1" specifying the group to which this user belongs.

After selecting the Next button in the notification screen SC1, the portable terminal 10 displays a print screen SC2 in T132 (S32). The print screen SC2 includes a selection field for selecting the image file to be printed, selection fields (i.e., the radio buttons in the print screen SC2) for selecting the color mode (i.e., color printing or monochrome printing), selection fields (i.e., the checkboxes in the print screen SC2) for selecting an account name from among "user1" and "group1", and an OK button. While not shown in the drawings, the print screen also includes selection fields for selecting printing conditions in addition to the color mode, such as the number of copies and the paper size.

In case A1, the user selects the radio button for color printing and the checkbox for "user1". In T134 the portable terminal 10 calculates the scheduled number of printing sheets based on the printing conditions and the number of pages in the image file selected in the print screen SC2, and determines that the scheduled number of printing sheets is less than or equal to "color 50" corresponding to account name "user1" (S36: NO).

In T136 the portable terminal 10 generates print data according to the image file and printing conditions selected in the print screen SC2 and transmits a print request to the printer 100 that includes the selected printing conditions, the print data, and the account information (account name "user1" and password "pass001") (S42).

In response to receiving the print request from the portable terminal 10 (S210: YES in FIG. 5), in T140 the printer 100 transmits a printer confirmation request to the server 500 (S212). The printer confirmation request includes the printer name of the printer 100 "printer1" and the account information included in the print request (i.e., "user1" and "pass001").

After receiving the printer confirmation request from the printer 100 (S150: YES in FIG. 4), in T142 the server 500 determines that authorization was successful, as described in T120 (S106: YES within S152). In T144 the server 500 transmits an authorized notification to the printer 100 (S154). The authorized notification includes "color 50" and "mono 50" corresponding to the account name "user1".

After receiving this authorized notification from the server 500 (S214 of FIG. 5), in T150 the printer 100 performs color printing for all of the scheduled number of printing sheets (S218) since the color mode in the printing conditions included in the print request specifies color printing and the scheduled number of printing sheets is no greater than "color 50" included in the authorized notification (S216: NO). In T152 the printer 100 transmits the printed sheet count and color mode information indicating color printing to the server 500 (S220).

After receiving the printed sheet count and the color mode information from the printer 100 (S156: YES in FIG. 4), in T154 the server 500 subtracts the printed sheet count from the number of remaining printing sheets "50" for color printing associated with the account name "user1" (S158).

Specific Case A2

Next, a specific case A2 will be described with reference to FIG. 7. This case is identical to case A1, except that the scheduled number of printing sheets is greater than "color 50" associated with the account name "user1". The same processes T106-T132 of FIG. 6 described in case A1 are executed in case A2.

In T170 the portable terminal 10 determines that the scheduled number of printing sheets is greater than "color 50" (S36: YES in FIG. 3). Consequently, in T172 the portable terminal 10 displays a warning screen SC3 on the display 14 (S38). In T174 the user selects the OK button in the warning screen SC3 (S40: YES). As a result, in T176 the portable terminal 10 transmits a print request to the printer 100, as in the process of T136 in FIG. 6. Steps T180-T184 are identical to steps T140-T144 in FIG. 6.

In T186 the printer 100 displays a confirmation screen similar to the SC3 (S230) since the color mode in the printing conditions included in the print request specifies color printing and the scheduled number of printing sheets is greater than "color 50" included in the authorized information (S216: YES in FIG. 5). When the OK button is selected in this confirmation screen (S232: YES), in T190 the printer 100 performs color printing for only a portion of the scheduled number of printing sheets (S218). Steps T192 and T194 are identical to steps T152 and T154 in FIG. 6.

Specific Cases A3 and A4

Figure 8:
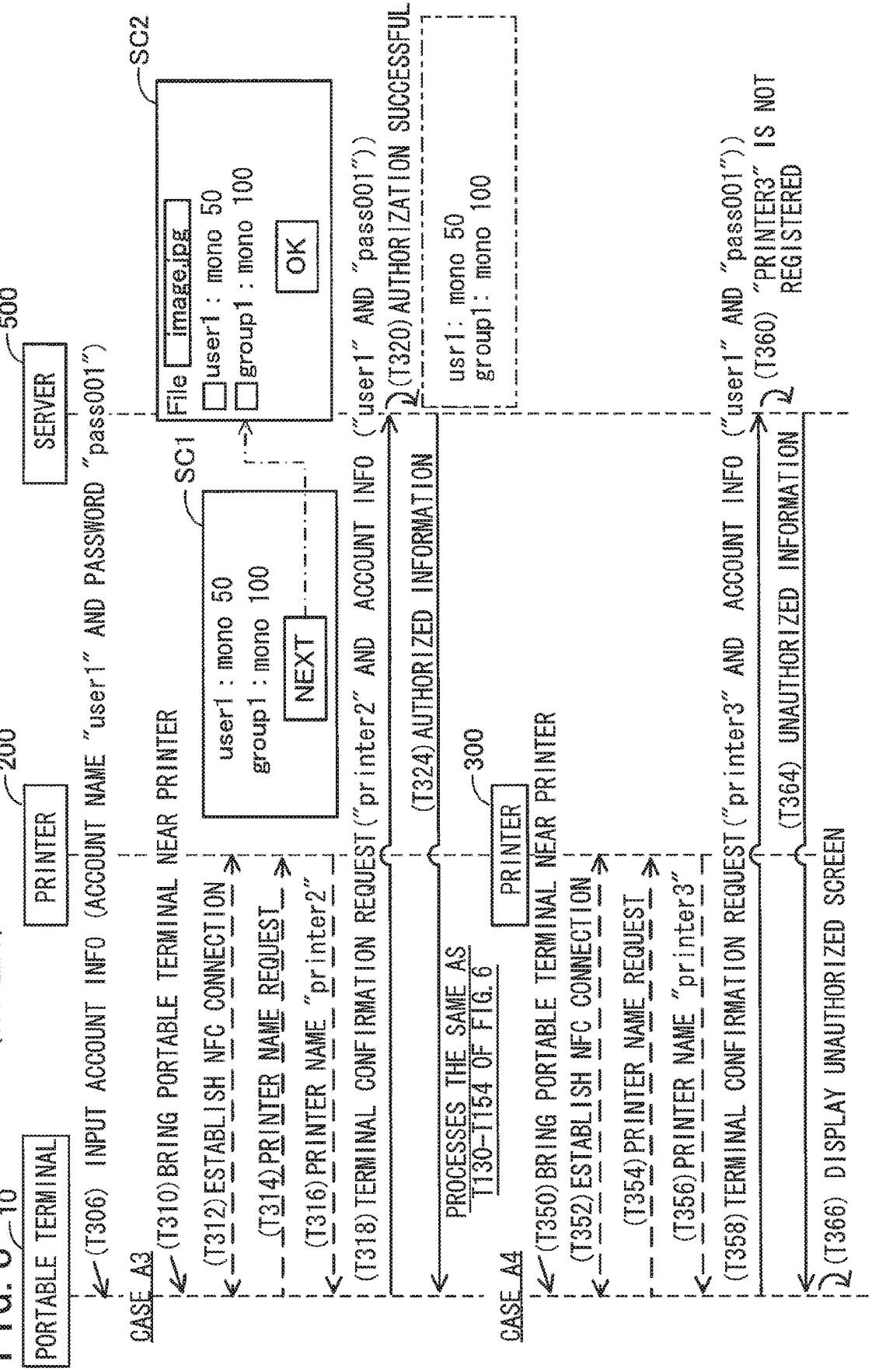
FIG. 8 is a sequence diagram illustrating a process executed in the communication system in a case A3 where only the number of remaining sheets for monochrome printing is displayed and in a case A4 where a printer confirmation request includes a printer name "printer3" according to the first embodiment.

Next, specific cases A3 and A4 will be described with reference to FIG. 8. In FIG. 8, step T306 is identical to step T106 of FIG. 6.

Case A3

Case A3 is identical to case A1, except that the portable terminal 10 is brought near the printer 200 instead of the printer 100. Steps T310-T320 are identical to steps T110-T120 of FIG. 6, except that the printer 200 and the printer name "printer2" for the printer 200 are used.

After completing step T320, the server 500 identifies the process information list in the printer table 528 that is associated with the printer name "printer2" (S108 of FIG. 4). Since the process information list identified above specifies only monochrome printing, the server 500 acquires only "mono 50" from the account table 530 that is associated with account name "user1" (S110). Further, since a target group is present (S120: YES), the server 500 acquires only "mono 100" from the account table 530 that is associated with the account name "group1" of the target group (S122). In T324 the server 500 transmits authorized information to the portable terminal 10 (S124). This authorized information includes "mono 50" associated with the account name "user1" and "mono 100" associated with the account name "group1".

Figure 6:
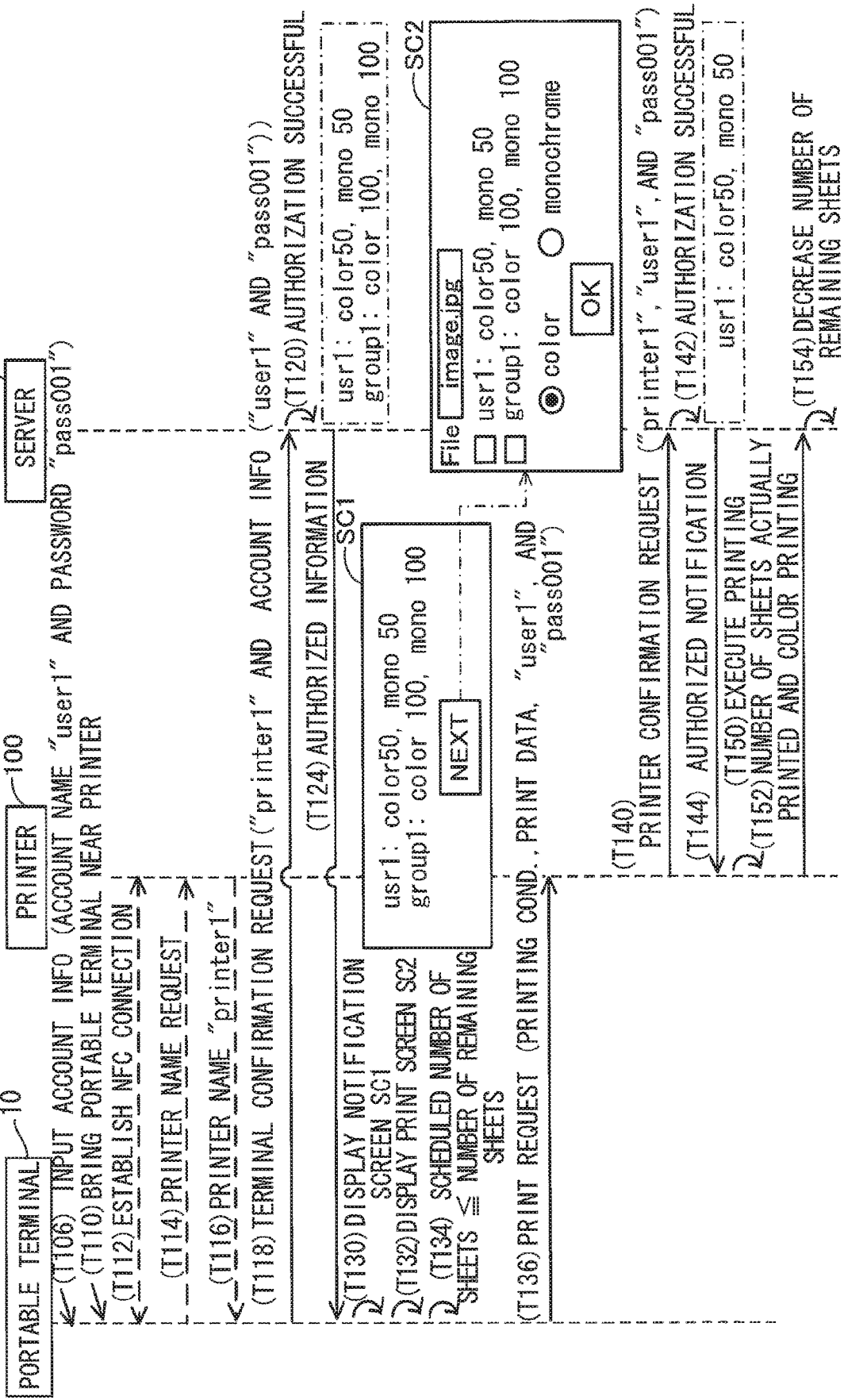
FIG. 6 is a sequence diagram illustrating a process executed in the communication system in a case A1 where the scheduled number of printing sheets is smaller than or equal to the number of remaining printing sheets according to the first embodiment.
Figure 7:
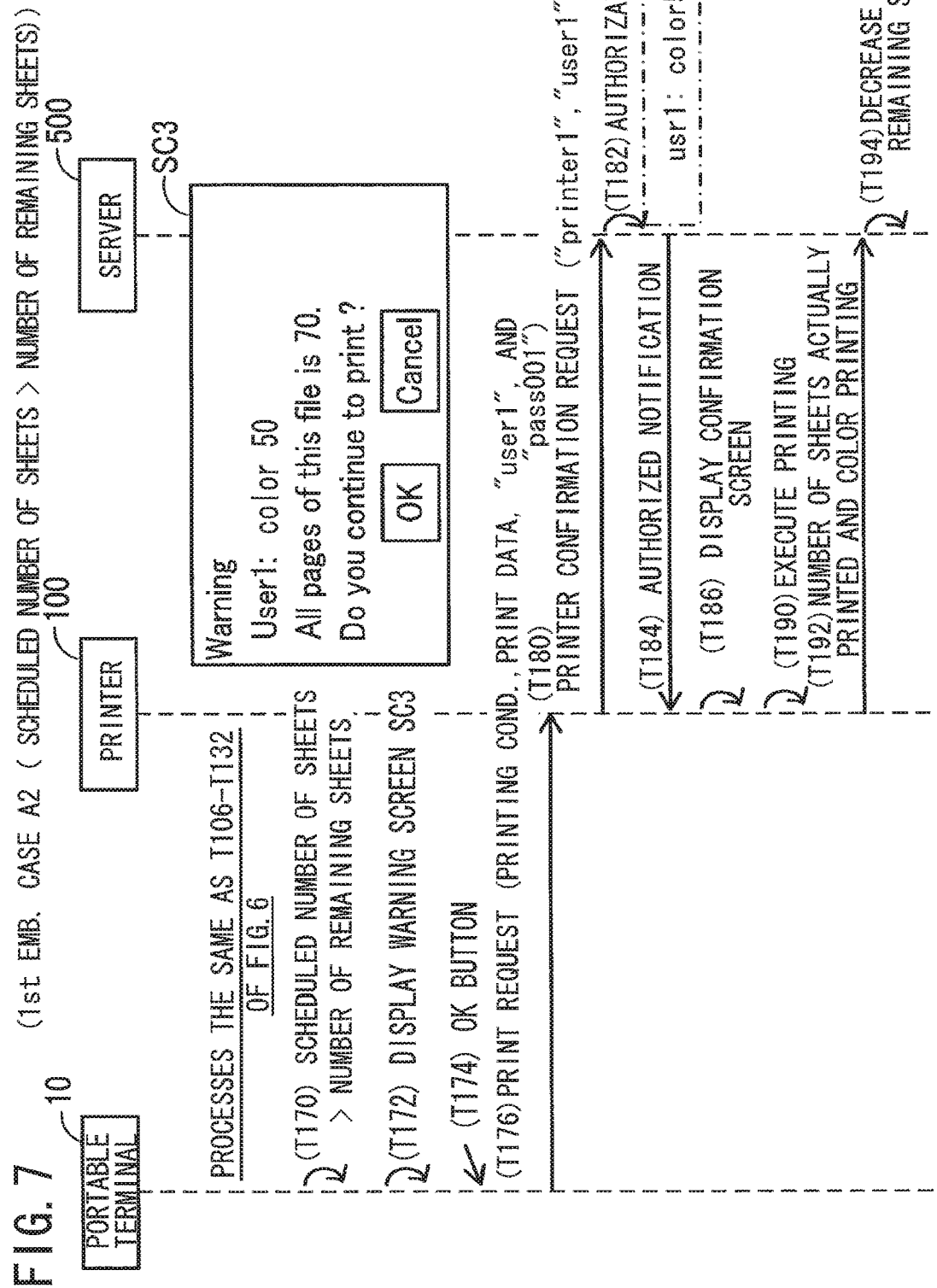
FIG. 7 is a sequence diagram illustrating a process executed in the communication system in a case A2 where the scheduled number of printing sheets is greater than the number of remaining printing sheets according to the first embodiment.

The process executed after T324 is identical to steps T130-T154 of FIG. 6, except that different options are displayed in the notification screen SC1 and the print screen SC2 and the printer 200 performs monochrome printing. More specifically, the notification screen SC1 does not include numbers of remaining sheets for color printing, but does include "mono 50" associated with the account name "user1" and "mono 100" associated with the account name "group1". Hence, the portable terminal 10 can display only the numbers of remaining sheets for monochrome printing that the printer 200 can implement, but does not display the numbers of remaining sheets for color printing that the printer 200 is incapable of implementing. Further, the print screen SC2 does not include radio buttons for selecting one of the options of color printing and monochrome printing. In this case, monochrome printing is automatically selected as the color mode in the printing conditions. Further, the user selects the checkbox for "user1" in the print screen SC2, and in T152, the printer 100 transmits the color mode information specifying monochrome printing, and in T154 the server 500 subtracts the printed sheet count from "mono 50" associated with the account name "user1".

Case A4

Case A4 is identical to case A3, except that the portable terminal 10 is brought near the printer 300 instead of the printer 100. Steps T350-T358 are identical to steps T310-T318, except that the printer 300 and the printer name "printer3" for the printer 300 are used.

In T360 the server 500 determines that the printer name "printer3" included in the terminal confirmation request is not recorded in the printer table 528 (S102: NO in FIG. 4). Accordingly, in T364 the server 500 transmits unauthorized information to the portable terminal 10 (S140).

In response to receiving the unauthorized information from the server 500 (S20: NO in FIG. 3), in T366 the portable terminal 10 displays an unauthorized screen on the display 14 (S44). In this way, the user can be notified that use of the printer 300 is not authorized.

Effects of the First Embodiment

As described above in the first embodiment, the portable terminal 10 receives the printer name "printer1" from the printer 100 (T116 in FIG. 6) and transmits a terminal confirmation request to the server 500 (T118) that includes the printer name "printer1" and the account information ("user1" and "pass001"). In response to receiving the terminal confirmation request from the portable terminal 10, the server 500 acquires "color 50" and "mono 50" from the account table 530 that are associated with the account name "user1" and transmits authorized information that includes the acquired "color 50" and "mono 50" to the portable terminal 10 (T124). Accordingly, the portable terminal 10 displays the notification screen SC1 that includes "color 50" and "mono 50" provided in the authorized information (T130). In this way, the portable terminal 10 can notify the user of the numbers of remaining sheets for color printing and monochrome printing that the user of the portable terminal 10 is authorized to use on the printer 100.

Correspondences

The portable terminal 10 is an example of a terminal device. The wireless interface 16 and the NFC interface 18 are an example of a terminal side communication interface (or a communication interface). The wireless interface 16 and the NFC interface 18 are respectively examples of a first communication interface and a second communication interface. The printers 100 and 200, the printer name "printer1" and "printer2" are respectively examples of a first image processing apparatus, a second image processing apparatus, first identification information, and second identification information. The account name "user1" is an example of target user information. "color 50" and "mono 50" corresponding to the account name "user1" are examples of target restriction information. "color 50" and "mono 50" are respectively examples of first restriction information and second restriction information. The color printing and the monochrome printing in the processing information are respectively examples of first processing information and second processing information. The account name "group1" and "color 100" and "mono 100" corresponding to the account name "group1" respectively examples of group information and group restriction information. The NFC is an example of a wireless link. The notification screen SC1 is an example of a prescribed screen.

Second Embodiment

Next, a communication system 2 according to a second embodiment will be described, wherein like parts and components are designated with the same reference numerals to avoid duplicating description. In the following descriptions, only processes different from those of the first embodiment will be explained.

Overview of the Process Performed on the Communication System

In the second embodiment, after displaying the account entry screen in T4 of FIG. 2, the portable terminal 10 displays a print screen on the display 14 prompting the user to select an image file and printing conditions. In T10, after inputting account information into the account entry screen and selecting an image file and printing conditions in the print screen, the user of the portable terminal 10 brings the portable terminal 10 near the printer 100. In the second embodiment, the portable terminal 10 does not display the print screen in T32.

Further, when the portable terminal 10 receives the printer name "printer1" from the printer 100 in T16, the portable terminal 10 calculates the scheduled number of printing sheets based on the number of pages in the image file selected in the print screen and the printing conditions selected in the print screen. In T18 the portable terminal 10 transmits a terminal confirmation request to the server 500 that includes the printer name "printer1", the target account information, the scheduled number of printing sheets, and the scheduled color mode information specifying the color mode selected in the printing conditions. Consequently, the CPU 522 of the server 500 determines whether the scheduled number of printing sheets is greater than the number of remaining printing sheets.

Further, when receiving a print request in T34, the printer 100 calculates the scheduled number of printing sheets based on the number of pages and the printing conditions in the print data. In T40 the printer 100 transmits a printer confirmation request to the server 500 that includes the printer name "printer1", the target account information, the calculated scheduled number of printing sheets, and the scheduled color mode information specifying the color mode in the printing conditions. Consequently, the server 500 determines whether the scheduled number of printing sheets is greater than the number of remaining printing sheets.

Process Executed on the Portable Terminal 10

Next, the process executed by the CPU 22 of the portable terminal 10 in accordance with the printing application 28 will be described in detail with reference to FIG. 3. In the second embodiment, the CPU 22 successively displays the account entry screen and the print screen on the display 14. Once the user has inputted account information into the account entry screen and has selected an image file and printing conditions in the print screen, the CPU 22 executes the process in S12 of FIG. 3.

In S18 the CPU 22 first calculates the scheduled number of printing sheets based on the number of pages in the image file selected in the print screen and the printing conditions selected in the print screen. Next, the CPU 22 transmits a terminal confirmation request to the server 500 that includes the target printer name, the target account information, the scheduled number of printing sheets, and the scheduled color mode information specifying the color mode selected in the printing conditions.

In S20 the CPU 22 monitors the wireless interface 16 for authorized information received from the server 500. In the second embodiment, the CPU 22 receives authorized information from the server 500 when the server 500 determines that authorization is successful and that the scheduled number of printing sheets in the terminal confirmation request is no greater than the number of remaining printing sheets. If the CPU 22 does not receive authorized information from the server 500 (S20: NO), the CPU 22 advances to S50.

In S50 the CPU 22 determines whether warning information or unauthorized information was received from the server 500. When authentication is successful on the server 500 and the scheduled number of printing sheets in the terminal confirmation request is greater than the number of remaining printing sheets, the CPU 22 receives the warning information from the server 500. The warning information is provided to warn the user that not all of the scheduled number of printing sheets can be printed. The warning information includes the number of remaining printing sheets. When the CPU 22 receives the warning information from the server 500 (S50: YES), the CPU 22 advances to S38. In S38 the CPU 22 displays a warning screen on the display 14 that includes the number of remaining printing sheets provided in the warning information. However, if authentication was not successful on the server 500, the CPU 22 receives the unauthorized information from the server 500 (S50: NO), and the CPU 22 executes S44 described in the first embodiment.

Process Executed on the Server

Next, the process executed by the CPU 522 of the server 500 in the second embodiment in accordance with the program 526 will be described with reference to FIG. 4. After executing the process in S110, the CPU 522 advances to S130. In other words, the CPU 522 does not perform the process in S120-S124 in the second embodiment. In S130 the CPU 522 identifies a target number of remaining printing sheets corresponding to the color mode specified by the scheduled color mode information in the terminal confirmation request based on the number of remaining sheets for monochrome printing (and color printing) acquired in S110. Next, the CPU 522 determines whether the scheduled number of printing sheets in the terminal confirmation request is greater than the target number of remaining printing sheets. The CPU 522 advances to S134 when determining that the scheduled number of printing sheets is greater than the target number of remaining printing sheets (S130: YES).

In S134 the CPU 522 transmits the warning information including the target number of remaining printing sheets to the portable terminal 10 via the network interface 516 (see S20: NO and S50: YES in FIG. 3). However, when the scheduled number of printing sheets is less than or equal to the number of remaining printing sheets (S130: NO), the CPU 522 advances to S132. Step S132 is identical to step S124, except that the transmitted authorized information includes the target number of remaining printing sheets.

In S152, steps S102-S110, S130, S134, and S140 are executed identically to those steps described above except that information in the printer confirmation request is used. The CPU 522 executes S154 when reaching a NO determination in S130 within S152. If the CPU 522 reaches an YES determination in S130 within S152, in S134 within S152 the CPU 522 transmits a warning notification to the target printer via the network interface 516. The warning notification is provided to notify the user that not all of the scheduled number of printing sheets can be printed, and includes the target number of remaining printing sheets.

Process Executed on the Printer

Next, the process executed by the CPU 122 of the printer 100 in the second embodiment in accordance with the program 126 will be described with reference to FIG. 5. In S212 of FIG. 5, the CPU 122 first calculates the scheduled number of printing sheets based on the number of pages in the print data included in the print request, and the printing conditions included in the print request. Next, the CPU 122 transmits a printer confirmation request to the server 500 that includes the printer name "printer1" of the printer 100, the account information included in the print request, the scheduled number of printing sheets, and the scheduled color mode information specifying the color mode in the printing conditions that are included in the print request.

In S240 the CPU 122 determines whether the authorized notification or the warning notification has been received from the server 500 via the wireless interface 116. When the authorized notification is received from the server 500 (S240: YES), the CPU 122 advances to S218 described in the first embodiment. However, when the warning notification is received from the server 500 (S240: NO), the CPU 122 advances to S230 described in the first embodiment.

Specific Case B1

Figure 9:
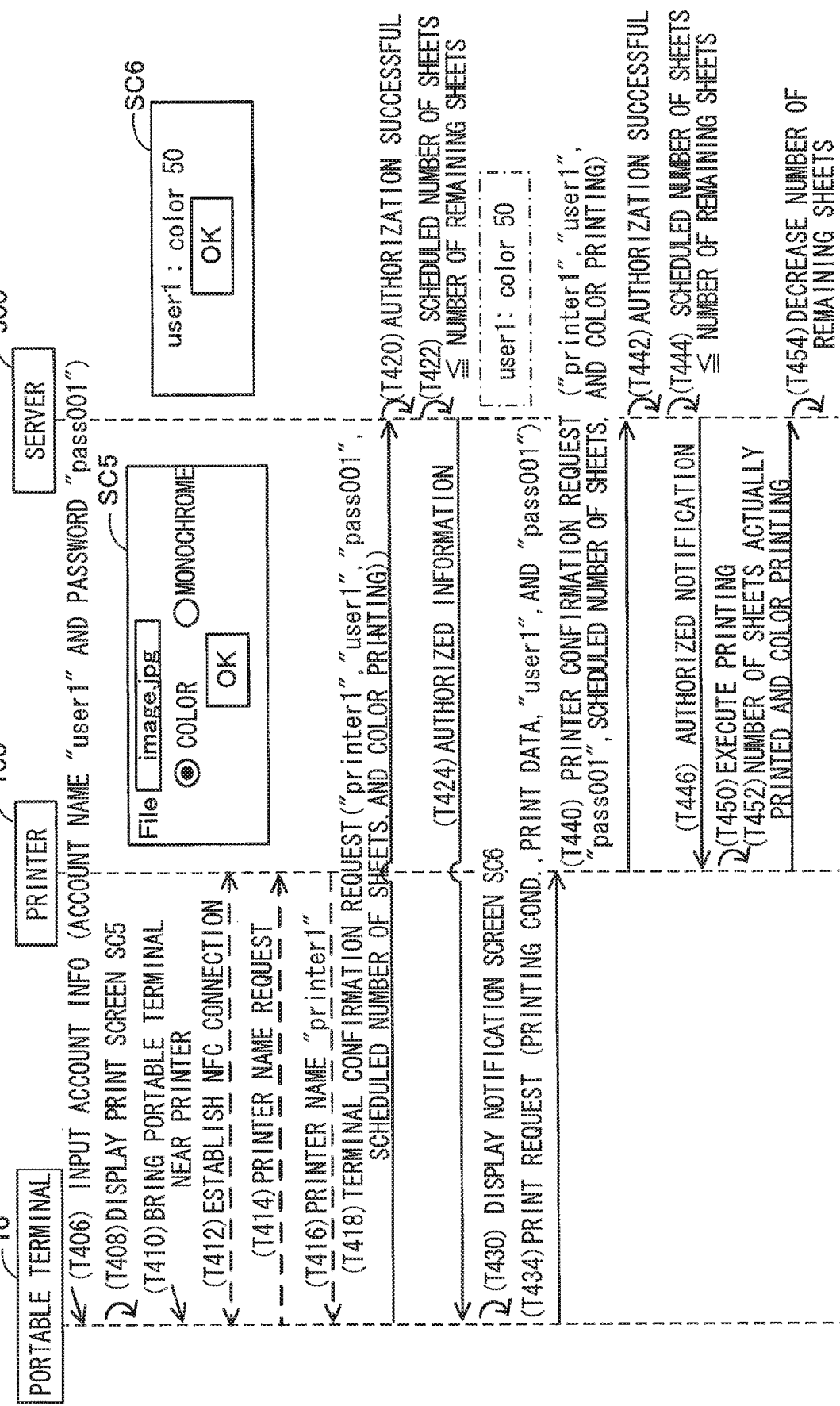
FIG. 9 is a sequence diagram illustrating a process executed in the communication system in a case B1 where the scheduled number of printing sheets is smaller than or equal to the number of remaining printing sheets according to a second embodiment.

Next, a specific case B1 according to the second embodiment will be described with reference to FIG. 9. In FIG. 9, step T406 is identical to step T106 of FIG. 6. In T408, the portable terminal 10 displays a print screen SC5 on the display 14. The user selects an image file to be printed and printing conditions in the print screen SC5. In this case, the user selects color printing as the color mode in the print screen SC5.

Steps T410-T416 are identical to steps T110-T116 of FIG. 6. In T418 the portable terminal 10 calculates the scheduled number of printing sheets and transmits a terminal confirmation request to the server 500. The terminal confirmation request includes the printer name "printer1", the account information (i.e., "user1" and "pass001"), the scheduled number of printing sheets, and the scheduled color mode information specifying color printing.

Step T420 is identical to step T120 of FIG. 6. In T422 the server 500 determines whether the scheduled number of printing sheets is no greater than "color 50" associated with the account name "user1" (S130: NO in FIG. 4). In T424 the server 500 transmits authorized information to the portable terminal 10 that includes "color 50" associated with the account name "user1" (S132).

In response to receiving the authorized information (S20: YES in FIG. 3), in T430 the portable terminal 10 displays a notification screen SC6 on the display 14 (S30). The notification screen SC6 includes "color 50" provided in the authorized information, and an OK button. When the user selects the OK button in the notification screen SC6, in T434 the portable terminal 10 transmits a print request to the printer 100 (S42), as in T136 of FIG. 6.

In T440 the printer 100 transmits a printer confirmation request to the server 500 (S212 of FIG. 5). The printer confirmation request includes the printer name "printer1" of the printer 100, the account information included in the print request (i.e., "user1" and "pass001"), the scheduled number of printing sheets, and the scheduled color mode information specifying color printing.

Steps T442 and T444 are identical to steps T420 and T422 described above. In T446 the server 500 transmits an authorized notification to the printer 100 (S154 of FIG. 4). Steps T450-T454 are identical to steps T150-T154 of FIG. 6.

Specific Case B2

Next, a specific case B2 will be described with reference to FIG. 10. This case is identical to case B1, except that the scheduled number of printing sheets is greater than "color 50" associated with account name "user1". The same processes described in T406-T420 of FIG. 9 in case B1 are also executed in case B2.

In T462 the server 500 determines that the scheduled number of printing sheets is greater than "color 50" associated with the account name "user1" (S130: YES in FIG. 4). Accordingly, in T464 the server 500 transmits warning information to the portable terminal 10 that includes "color 50" associated with account name "user1" (S134).

In T470 the portable terminal 10 displays a warning screen SC8 on the display 14 (S38 of FIG. 3). The warning screen SC8 includes "color 50" that is provided in the warning information. In T472 the user selects the OK button in the warning screen SC8 (S40: YES). Steps T478-T482 are identical to steps T434-T442 of FIG. 9. Step T484 is identical to step T462. In T486 the server 500 transmits a warning notification to the printer 100 that includes "color 50" associated with account name "user1" (S134 within S152).

In response to receiving the warning notification (S240: NO in FIG. 5), in T488 the printer 100 displays a confirmation screen (S230). When the user selects the OK button in this confirmation screen (S232: YES), in T490 the printer 100 performs color printing on only a number of sheets matching "color 50" provided in the warning notification (S218). Steps T492 and T494 are identical to steps T452 and T454 of FIG. 9.

Effects of the Second Embodiment

After the user has selected an image file to be printed in the second embodiment described above, the portable terminal 10 transmits a terminal confirmation request to the server 500 that includes the scheduled number of printing sheets of the image file (T418 of FIG. 9). If the server 500 determines that the scheduled number of printing sheets in the terminal confirmation request is no greater than "color 50" associated with the account name "user1" provided in the terminal confirmation request (T422), the server 500 transmits authorized information including "color 50" to the portable terminal 10 (T424). Next, the portable terminal 10 displays the notification screen SC6 on the display 14 including "color 50". In this way, the portable terminal 10 can notify the user of the portable terminal 10 regarding the number of remaining sheets for color printing available to the user through the printer 100. On the other hand, if the server 500 determines that the scheduled number of printing sheets in the terminal confirmation request is greater than "color 50" associated with the account name "user1" included in the terminal confirmation request (T462 in FIG. 10), the server 500 transmits warning information including "color 50" to the portable terminal 10 (T464). Next, the portable terminal 10 displays the warning screen SC8 including "color 50" on the display 14 (T470). In this way, the portable terminal 10 can notify the user of the portable terminal 10 regarding the number of remaining sheets for color printing available to the user through the printer 100. In the second embodiment, "color 50" in the authorized information of T424 and "color 50" in the warning information of T464 are examples of target restriction information. The notification screen SC6 and the warning screen SC8 are examples of a prescribed screen. The notification information is an example of a specific information.

While the disclosure has been described in detail with reference to the above embodiments, it would be apparent to those skilled in the art that various changes and modifications may be made thereto.

First Variation

In the embodiments described above, the account table 530 correlates account information with the number of remaining sheets for color printing available to the account identified by the account information. However, the account table 530 may instead correlate account information with a flag specifying whether the account identified by the account information can or cannot use the color printing function. In response to receiving a terminal confirmation request from the portable terminal 10, the server 500 may transmit a flag to the portable terminal 10 associated with the target account information included in the terminal confirmation request. Subsequently, the portable terminal 10 may use the flag received from the server 500 to display a message indicating whether the target account can or cannot use the color printing function. In this variation, the flag is an example of restriction information.

Second Variation

The communication system 2 may include at least one scanner instead of or in addition to the printer 100, as a peripheral device. The portable terminal 10 may transmit a scan request to the scanner instead of transmitting the print request to the printer (T34, S42) so that the scanner scans an image. The server 500 may store a scanner table in place of (or in addition to) the printer table 528. The scanner table correlates a scanner name for each scanner with an account list. In this case, the account table 530 may correlate account information with the number of remaining scanning operations (or sheets) available to the account identified by the account information. In response to receiving a terminal confirmation request from the portable terminal 10, the server 500 may transmit the number of remaining scanning operations associated with the target account information included in the terminal confirmation request to the portable terminal 10. Subsequently, the portable terminal 10 may display the number of remaining scanning operations received from the server 500. In this variation, the scanner is an example of a first image processing apparatus. The number of remaining scanning operations is an example of restriction information.

Third Variation

The communication system 2 may include at least one multifunction peripheral instead of or in addition to the printer 100, as a peripheral device. The multifunction peripheral is a device capable of implementing both printing and scanning functions in this example. The portable terminal 10 may transmit a scan request or a print request to the scanner instead of transmitting the print request to the printer (T34, S42) so that the multifunction peripheral prints or scans an image. The server 500 may store a multifunction peripheral table in place of (or in addition to) the printer table 528. The multifunction peripheral table correlates the peripheral name of each multifunction peripheral with an account list. In this case, the account table 530 may correlate account information with a first flag specifying whether the account identified by the account information can or cannot use the printing function, and a second flag specifying whether the account can or cannot use the scanning function. In response to receiving a terminal confirmation request from the portable terminal 10, the server 500 may transmit both first and second flags associated with the target account information included in the terminal confirmation request to the portable terminal 10. Subsequently, the portable terminal 10 may use the first flag received from the server 500 to display information indicating whether the target account can or cannot use the printing function, and may use the second flag received from the server 500 to display information indicating whether the target account can or cannot use the scanning function. In this variation, the multifunction peripheral is an example of a first image processing apparatus. The first flag and the second flag are examples of restriction information.

Fourth Variation

In the embodiments described above, the memory 524 stores the printer table 528 and the account table 530. However, the memory 524 may function to store one specific table instead. This specific table may correlate the account name "user1" with the printer name "printer1" of the printer 100 and a first number of remaining sheets for color printing available through the printer 100 to the account having account name "user1". Further, the specific table may associate the account name "user1" with the printer name "printer2" of the printer 200 and a second number of remaining sheets for color printing available through the printer 200 to the account having account name "user1". In this variation, the target restriction information need not include information that restricts contents (settings, factors, or aspects) of image processes available to the target user collectively through the first image processing apparatus and the second image processing apparatus.

Fifth Variation

The process in S108 of FIG. 4 may be omitted. In this case, in S110 the CPU 522 may acquire both numbers of remaining sheets for color printing and monochrome printing associated with the target account information from the account table 530. In this variation, the second server-side receiving portion, the second acquiring portion, and the second server-side transmitting portion may be omitted.

Sixth Variation

The processes in S120 and S122 of FIG. 4 may also be omitted. In this variation, the identifying portion and the third acquiring portion may be omitted.

Seventh Variation

The process in S140 of FIG. 4 may also be omitted. In this variation, the fourth server-side transmitting portion may be omitted.

Eighth Variation

In the embodiments described above, the printer name request is transmitted to the printer via the NFC interface 18, and the printer name is received from the printer via the NFC interface 18. However, the printer name request may instead by transmitted to the printer via the wireless interface 16, and the printer name may be received from the printer via the wireless interface 16. Generally speaking, the communication interface need not be provided with both first and second communication interfaces.

Ninth Variation

In the embodiments described above, the portable terminal 10 displays a notification screen (S32 of FIG. 3). However, the portable terminal 10 may instead transmit a sheet number print request to the printer requesting the printer to print the number of remaining printing sheets included in the authorized information, thereby controlling the printer to execute a printing operation on the number of remaining printing sheets. In this variation, transmitting the sheet number print request is an example of outputting restricting information to an external apparatus.

The technical elements described in the present specification or drawings exhibit technical utility either independently or in various combinations and shall not be limited to the combinations set forth in the claims at the time of filing. Further, the technology illustrated in the specification or drawings achieves multiple objects at the same time, and achieving one of the objects itself demonstrates technical utility.

What is claimed is:
1. A communication system comprising:
   a terminal device;
   a printer comprising:
      a printer side communication interface; and
      a printer side controller configured to perform transmitting first printer identification information to the terminal device via the printer side communication interface, the first printer identification information identifying the printer; and
   a server comprising:
      a server side communication interface;
      a server side controller; and
      a memory storing the first printer identification information, a plurality of sets of user information, and a plurality of sets of restriction information, each set of restriction information including remaining-sheet-number information, the first printer identification information being correlated to the plurality of sets of user information and the plurality of sets of restriction information, each of the plurality of sets of user information specifying a user or a group permitted to use the printer, each of the plurality of sets of user information corresponding to one of the plurality of sets of restriction information, the remaining-sheet-number information indicating number of remaining sheets available to a user or a group specified by a corresponding set of user information, the print process being performed by the printer, wherein the memory further stores: first data in which group information and a plurality of sets of user information are correlated to each other, the group information identifying a group, the plurality of sets of user information identifying respective ones of a plurality of users belonging to the group, the plurality of users being permitted to use the printer; and second data in which the first printer identification information, the group information, and group restriction information including group remaining-sheet-number information are correlated to each other, the group remaining-sheet-number information indicating number of remaining sheets available to the plurality of users specified by the plurality of sets of user information correlated to the group information;

wherein the terminal device comprises:
a terminal side communication interface; and
a terminal side controller configured to perform:
receiving, from the printer via the terminal side communication interface, the first printer identification information; and
in response to receiving the first printer identification information from the printer, transmitting a terminal confirmation request including target user information and the received first printer identification information to the server via the terminal side communication interface, the target user information specifying a target user or a target group, the terminal confirmation request prompting the server to transmit the restriction information including the remaining-sheet-number information, wherein the server side controller is configured to perform:
receiving from the terminal device via the server side communication interface the terminal confirmation request;
after receiving the terminal confirmation request, acquiring target restriction information including target remaining-sheet-number information from among the plurality of sets of restriction information correlated to the first printer identification information, the target restriction information including the target remaining-sheet-number information corresponding to the target user information, which is included in the terminal confirmation request, among the plurality of sets of user information;
after receiving the terminal confirmation request, specifying the group information correlated to the first printer identification information included in the terminal confirmation request and specifying the plurality of sets of user information correlated to the group information;
in a first case where one of the specified plurality of sets of user information specifies the target user, acquiring the group restriction information including the group remaining-sheet-number information correlated to the group information, wherein the acquiring the group restriction information including the group remaining-sheet-number information is not performed in a second case where any of the specified plurality of sets of user information does not specify the target user;
in the first case, transmitting both the acquired target restriction information including the target remaining-sheet-number information and the acquired group restriction information including the group remaining-sheet-number information to the terminal device via the server side communication interface; and
in the second case, transmitting the acquired target restriction information including the target remaining-sheet-number information without transmitting the group restriction information including the group remaining-sheet-number information to the terminal device via the server side communication interface, wherein the terminal side controller is further configured to perform:
in the first case, receiving both the target restriction information including the target remaining-sheet-number information and the group restriction information including the group remaining-sheet-number information from the server via the terminal side communication interface as a response to transmission of the terminal confirmation request;
in the first case, outputting both the target restriction information including the target remaining-sheet-number information and the group restriction information including the group remaining-sheet-number information;
in the second case, receiving the target restriction information including the target remaining-sheet-number information from the server via the terminal side communication interface as a response to transmission of the terminal confirmation request;
in the second case, outputting the target restriction information including the target remaining-sheet-number information; and
transmitting print data and the target user information to the printer via the terminal side communication interface, wherein the printer side controller is configured to perform:
in response to receiving the print data and the target user information from the terminal device via the printer side communication interface, transmitting a printer confirmation request including the first printer identification information and the target user information to the server via the printer side communication interface, the printer confirmation request prompting the server to transmit the restriction information including the remaining-sheet-number information, wherein the transmitting a terminal confirmation request to the server from the terminal side controller, the outputting both the target restriction information including the target remaining-sheet-number information and the group restriction information including the group remaining-sheet-number information by the terminal side controller in the first case, the transmitting the print data and the target user information to the printer from the terminal side controller, and the transmitting printer confirmation request to the server from the printer side controller are executed in this order, wherein the transmitting a terminal confirmation request to the server from the terminal side controller, the outputting target restriction information including the target remaining-sheet-number information by the terminal side controller in the second case, the transmitting the print data and the target user information to the printer from the terminal side controller, the transmitting a printer confirmation request to the server from the printer side controller are executed in this order, wherein the server side controller is configured further to perform:
in response to receiving the printer confirmation request from the printer via the server side communication interface, acquiring target restriction information including target remaining-sheet-number information corresponding to the target user information from among the plurality of sets of restriction information; and
transmitting the acquired target restriction information including the target remaining-sheet-number information to the printer via the server side communication interface, wherein the printer side controller is further configured to perform, in response to receiving the target restriction information including the target remaining-sheet-number information from the server via the printer side communication interface, printing an image on a sheet based on the print data so that printing the image is performed within a permitted scope defined by the target restriction information including the target remaining-sheet-number information.

2. The communication system according to claim 1, wherein the target remaining-sheet-number information includes first remaining-sheet-number information and second remaining-sheet-number information, the first remaining-sheet-number information indicating number of remaining sheets available to the target user or the target group specified by the target user information in a first print process, the second remaining-sheet-number information indicating number of remaining sheets available to the user or the group specified by the corresponding set of user information in a second print process different from the first process.

3. The communication system according to claim 1, wherein the memory stores second printer identification information, the target user information, and the target restriction information including the target remaining-sheet-number information, the second printer identification information being correlated to the user information and the target restriction information including the target remaining-sheet-number information, the second printer identification information identifying a second printer different from the printer,
wherein the target remaining-sheet-number information includes information indicating the number of sheets which is a total number of sheets that the printer and the second printer is capable of using for the target user or the target group specified by the target user information.

4. The communication system according to claim 3, wherein the target restriction information includes first restriction information concerning a first print process and second restriction information concerning a second print process different from the first print process, the first restriction information including first remaining-sheet-number information, the second restriction information including second remaining-sheet-number information, the first remaining-sheet-number information indicating number of remaining sheets available to the target user or the target group specified by the target user information in the first print process, the second remaining-sheet-number information indicating number of remaining sheets available to the target user or the target group specified by the target user information in the second print process, the printer being capable of performing both the first print process and the second print process, the second printer being incapable of performing the first print process but capable of performing the second print process,
wherein in the memory the second printer identification information is not correlated to first processing information but correlated to second processing information, the first processing information specifying the first print process, the second processing information specifying the second print process,
wherein the terminal side controller is further configured to perform:
receiving, from the second printer via the terminal side communication interface, the second printer identification information identifying the second printer; and
in response to receiving the second printer identification information from the second printer, transmitting the target user information and the received second printer identification information to the server via the terminal side communication interface,
wherein the server side controller is further configured to perform:
receiving the target user information and the second printer identification information from the terminal device via the server side communication interface;
after receiving the target user information and the second printer identification information from the terminal device, specifying the second processing information correlated to the second printer identification information, and acquiring the second restriction information including the second remaining-sheet-number information concerning the second print process specified by the specified second processing information without acquiring the first restriction information including the first remaining-sheet-number information from the target restriction information correlated to both the second printer identification information and the user information matching the target user information; and
transmitting the acquired second restriction information including the second remaining-sheet-number information to the terminal device via the server side communication interface,
wherein the terminal side controller is further configured to perform:
receiving the second restriction information including the second remaining-sheet-number information from the server via the terminal side communication interface as a response to transmission of the target user information and the second printer identification information; and
outputting the second restriction information including the second remaining-sheet-number information.

5. The communication system according to claim 1, wherein the terminal side controller is further configured to perform transmitting the target user information and scheduled number of sheets together with the first printer identification information via the terminal side communication interface, the scheduled number of sheets being scheduled to be printed by the printer,
wherein the server side controller is further configured to perform:
receiving the target user information and the scheduled number of sheets from the terminal device together with the first printer identification information via the server side communication interface;
after receiving the target user information and the scheduled number of sheets together with the first printer identification information from the terminal device, specifying the number of remaining sheets based on the target remaining-sheet-number information in the target restriction information correlated to the user information matching the target user information, and determining whether the scheduled number of sheets is greater than the specified number of remaining sheets; and
in a case where the scheduled number of sheets is greater than the specified number of remaining sheets, transmitting specific information to the terminal device via the server side communication interface, the specific information indicating that the scheduled number of sheets cannot be printed,
wherein the server side controller transmits the target restriction information including the target remainingsheet-number information to the terminal device in a case where the scheduled number of sheets is smaller than or equal to the specified number of remaining sheets.

6. The communication system according to claim 1, wherein the terminal side controller is further configured to perform:

receiving, from a third printer via the terminal side communication interface, third printer identification information identifying the third printer; and in response to receiving the third printer identification information from the third printer, transmitting the target user information and the received third printer identification information to the server via the terminal side communication interface, wherein the server side controller is further configured to perform:

in a case where the terminal device receives the third printer identification information from the third printer, receiving the third printer identification information and the target user information from the terminal device via the server side communication interface; and in a case where the target user information and the third printer identification information are received from the terminal device, and the memory does not store third printer identification information identifying the third printer, transmitting unauthorized information to the terminal device via the server side communication interface, the unauthorized information indicating that the target user is not authorized to use the third printer.

* * * * *